(12) United States Patent
Sakurai et al.

(10) Patent No.: US 11,601,074 B2
(45) Date of Patent: Mar. 7, 2023

(54) ACTUATOR

(71) Applicants: DENSO CORPORATION, Kariya (JP); TOKYO INSTITUTE OF TECHNOLOGY, Tokyo (JP); NATIONAL UNIVERSITY CORPORATION TOKAI NATIONAL HIGHER EDUCATION AND RESEARCH SYSTEM, Nagoya (JP)

(72) Inventors: Daichi Sakurai, Kariya (JP); Seiichiro Washino, Kariya (JP); Shota Chatani, Kariya (JP); Haruhiko Watanabe, Kariya (JP); Masatoshi Shioya, Tokyo (JP); Daisuke Kimura, Tokyo (JP); Toshihira Irisawa, Nagoya (JP); Kentaro Takagi, Nagoya (JP); Takashi Hasegawa, Nagoya (JP)

(73) Assignees: DENSO CORPORATION, Kariya (JP); TOKYO INSTITUTE OF TECHNOLOGY, Tokyo (JP); NATIONAL UNIVERSITY CORPORATION TOKAI NATIONAL HIGHER EDUCATION AND RESEARCH SYSTEM, Nagoya (JP)

(*) Notice: Subject to any disclaimer, the term of this patent is extended or adjusted under 35 U.S.C. 154(b) by 0 days.

(21) Appl. No.: 17/211,279

(22) Filed: Mar. 24, 2021

(65) Prior Publication Data

US 2021/0305917 A1    Sep. 30, 2021

(30) Foreign Application Priority Data

Mar. 31, 2020 (JP) .............................. JP2020-062859
Feb. 5, 2021 (JP) .............................. JP2021-017563

(51) Int. Cl.
*H02N 10/00* (2006.01)
*F03G 7/06* (2006.01)

(52) U.S. Cl.
CPC ............... *H02N 10/00* (2013.01); *F03G 7/06* (2013.01); *F03G 7/0612* (2021.08)

(58) Field of Classification Search
CPC ......... H02N 10/00; F03G 7/06; F03G 7/0612; F03G 7/0121

(Continued)

(56) References Cited

U.S. PATENT DOCUMENTS 2,331,464 A * 10/1943 Fillo ...................... H01H 37/36
  236/99 D
3,155,019 A * 11/1964 Stiglic ..................... F42B 10/64
  92/39

(Continued)

FOREIGN PATENT DOCUMENTS

JP    2019-026966 A    2/2019

OTHER PUBLICATIONS

Choy et al.; Negative Thermal Expansion in Oriented Crystalline Polymers; Journal of Polymer Science: Polymer Physics Edition; 1981; vol. 19; pp. 335-352.

(Continued)

*Primary Examiner* — Hoang M Nguyen
(74) *Attorney, Agent, or Firm* — Oliff PLC

(57) ABSTRACT

An actuator capable of attaining high output. The actuator includes a frame structure part that forms a frame structure surrounding a housing part, and a volume change part housed in the housing part. The volume change part increases a volume thereof by input of external energy. The frame structure part has a higher Young's modulus than a Young's modulus of the volume change part. The housing part has an anisotropic shape, with a maximum width in first (Continued)

direction of the housing part longer than a maximum width in second direction different from the first direction of the housing part.

12 Claims, 11 Drawing Sheets

(58) Field of Classification Search
USPC .............................. 60/527–529; 310/306–307
See application file for complete search history.

(56) References Cited

U.S. PATENT DOCUMENTS

| | | | | |
|---|---|---|---|---|
| 3,186,230 | A * | 6/1965 | Scherer | G01K 5/44 60/527 |
| 3,690,065 | A * | 9/1972 | Bucalo | F03G 7/06 252/79.4 |
| 5,158,106 | A * | 10/1992 | McIntosh | F16K 41/10 62/50.7 |
| 5,509,269 | A * | 4/1996 | Kuze | G05D 23/02 60/527 |
| 5,720,169 | A * | 2/1998 | Schneider | F03G 7/06 60/528 |
| 9,784,249 | B2 | 10/2017 | Li et al. | |
| 2005/0078570 | A1* | 4/2005 | Kabasawa | G11B 7/12 369/44.22 |
| 2015/0219078 | A1 | 8/2015 | Li et al. | |

OTHER PUBLICATIONS

Nakamae et al.; "Temperature dependence of crystal elastic modulus of nylon 6*"; Department of Industrial Chemistry, Kobe University; pp. 1-17.

Ijima et al.; "Topics of Polymer Materials Studied with Differential Scanning Calorimetry"; The Japan Society of Calorimetry and Thermal Analysis; 2009; 36 (5); pp. 247-254.

Kimura et al.; "A study on the large negative thermal expansion coefficient of polymer fibers"; Tokyo Institute of Technology et al.; pp. 1-2.

Kimura et al.;"Study on large negative line expansion rate of polymers filaments"; Tokyo Institute of Technology et al.; pp. 1.

Fukui et al.; "Basic Properties of Coiled Nylon Monofilament Actuator"; JSPE; 2017; pp. 171-172.

Haines et al.; "Artificial Muscles from Fishing Line and Sewing Thread"; Science; Feb. 2014; vol. 343; pp. 868-872.

Irisawa et al.; "Wear Resistance and Tensile Properties of Filler-added Polyamide 6 Fibers"; Sen'i Gakkaishi; 2011; vol. 67; No. 5; pp. 109-118.

* cited by examiner

ACTUATOR

CROSS-REFERENCE TO RELATED APPLICATION

This application is based on and claims the benefit of priority from earlier Japanese Patent Applications Nos. 2020-062859 filed Mar. 31, 2020 and 2021-017563 filed Feb. 5, 2021, the entire contents of which are incorporated herein by reference.

BACKGROUND

The present invention relates to an actuator.

As an actuator including a material that converts externally input external energy except mechanical energy into mechanical energy and outputs outward force, an actuator including a polymer fiber material is known.

SUMMARY

An actuator according to an embodiment of the invention includes: a frame structure part (12, 21, 22, 42) and a volume change part (13, 23, 43), wherein
the volume change part increases a volume thereof by external input, and
the volume change part increases the volume thereof by the external input, and the frame structure part is deformed to contract the housing part in first direction (D2, D11) and widen the housing part in second direction (D3, D12) along with the increase of the volume of the volume change part.

A reference signs in parentheses assigned to each constituent element and the like represents one example of the correspondence relationship between the constituent element and the like and a specific constituent element and the like described in embodiments below and do not intend to limit the present invention.

DETAILED DESCRIPTION OF THE PREFERRED EMBODIMENTS

Figure 1:
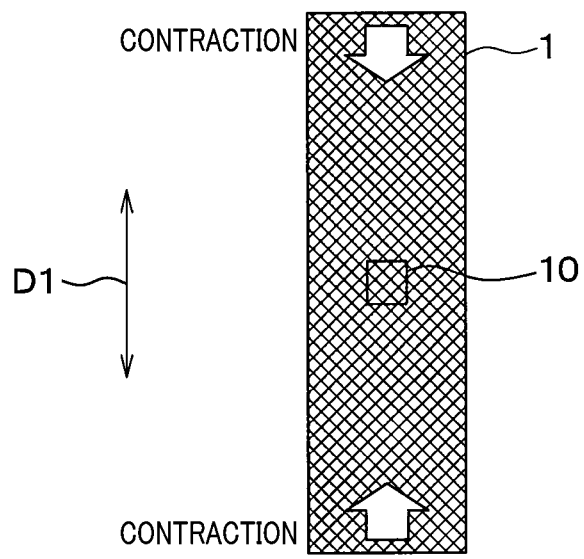
FIG. 1 is a schematic view of an actuator according to a first embodiment.

Hereinafter, embodiments of the present invention are described with reference to the drawings. The description is made with the identical reference signs assigned to parts that are identical or equivalent to each other between the embodiments below.

As an actuator including a material that converts externally input external energy except mechanical energy into mechanical energy and outputs outward force, U.S. Pat. No. 9,784,249 and Proceedings of JSPE Spring Conference Academic Lecture 2017, The Japan Society for Precision Engineering, No. 171, p. 172 each disclose an actuator including a polymer fiber material. This actuator uses action of the polymer fiber material generated by input of heat energy. The actuator disclosed in U.S. Pat. No. 9,784,249 includes a PA6 or PA66 fiber material. The actuator disclosed in the proceedings includes a PA11 fiber material.

Meanwhile, an actuator having higher output than the output of conventional actuators is being required. In order to attain high output of the actuator, in other words, in order to increase the outward force and make the actuator material more deformable, it is necessary to use a material having both a property of generating large distortion by input of external energy and a property of having a high Young's modulus.

In view of the forgoing, it is an object of the present invention to provide an actuator capable of attaining high output.

In order to achieve the object, an actuator according to an embodiment of the invention includes: a frame structure part (12, 21, 22, 42) that forms a frame structure surrounding a housing part (11, 24, 41); and a volume change part (13, 23, 43) housed in the housing part, wherein the volume change part increases a volume thereof by external input of external energy except mechanical energy, the frame structure part has a higher Young's modulus than a Young's modulus of the volume change part, and the volume change part increases the volume thereof by the external input of the external energy into the volume change part, and the frame structure part is deformed to contract the housing part in first direction (D2, D11) and widen the housing part in second direction (D3, D12) along with the increase of the volume of the volume change part.

This configuration enables the actuator to have a higher Young's modulus than the Young's modulus of an actuator including only one material constituting the volume change part.

This configuration also allows the volume change part to increase the volume thereof by input of external energy into the volume change part, and allows the frame structure part to be deformed to contract the housing part in first direction and widen the housing part in second direction along with the increase of the volume of the volume change part. This mechanism enables the actuator to increase distortion generated at the time of input of external energy, compared to an actuator including only a material constituting the frame structure part and an actuator including only a material constituting the volume change part.

Thus, the actuator is enabled to have both the property of generating large distortion by input of external energy and the property of having a high Young's modulus. Accordingly, the actuator is enabled to attain high output.

First Embodiment

An actuator 1 illustrated in FIG. 1 includes a material that converts externally input external energy except mechanical energy into mechanical energy and outputs the mechanical energy. Specifically, the actuator 1 includes a fiber material and is contracted in a fiber axis direction D1 of the fiber material by input of external energy. The contraction allows the actuator 1 to output tensile force in the fiber axis direction D1. The actuator 1 illustrated in FIG. 1 is linear but may be coiled in order to increase a stroke.

Next, the material design of the actuator 1 that has been found by the inventors of the present invention is described.

Figure 2:
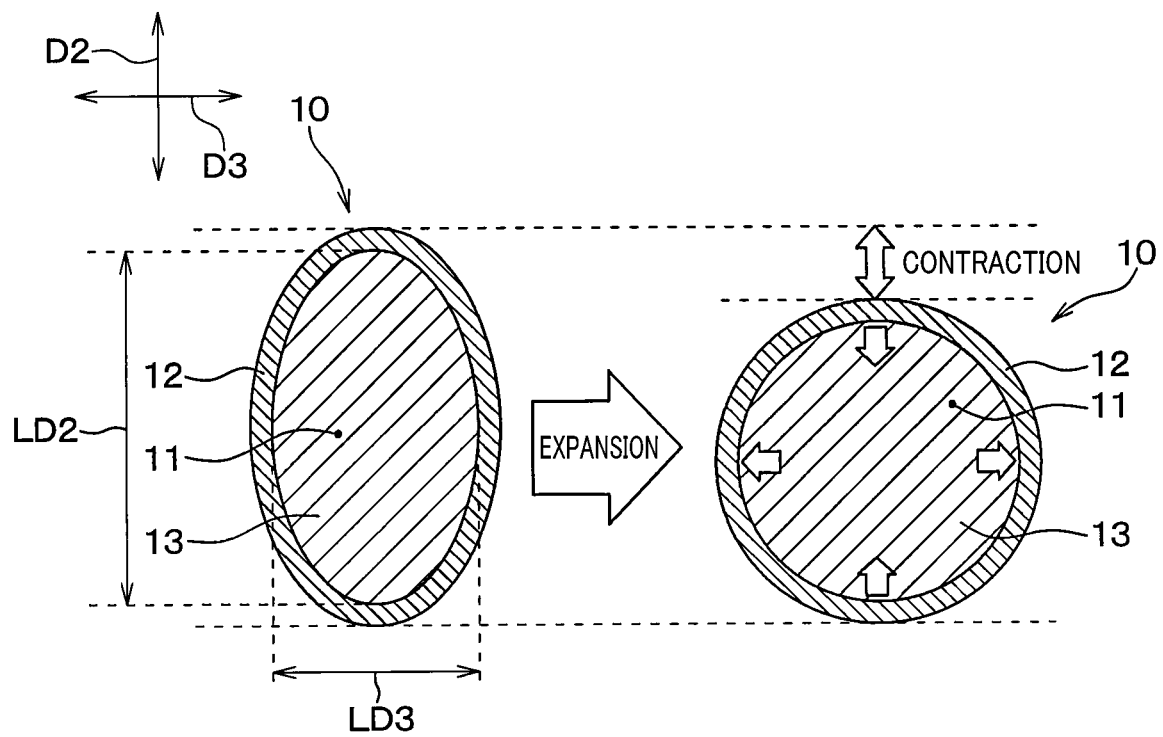
FIG. 2 is a diagram illustrating a model of a unit structure of the actuator in FIG. 1.

The actuator 1 includes a material having a plurality of unit structures 10. FIG. 2 illustrates, as a model diagram, a change of a unit structure between before and after the input of energy. The diagram on the left in FIG. 2 illustrates a state before the input of energy. The diagram on the right in FIG. 2 illustrates a state after the input of energy. As illustrated on the left in FIG. 2, the unit structure 10 includes a frame structure part 12 that forms a frame structure surrounding one housing part 11, and a volume change part 13 housed in the one housing part 11. That is, the actuator 1 includes the frame structure part 12 and the volume change part 13.

The frame structure part 12 is a part contributing to mainly the strength of the material and is a structure part that forms the frame of the material. The frame structure part 12 has a higher Young's modulus than the Young's modulus of the volume change part 13. The frame structure part 12 has a three-dimensional structure. The frame structure part 12 is pantographically stretched. A portion in the stretch direction of the frame structure part 12 is configured to be inclined in a direction perpendicular to the stretch direction.

The frame structure part 12 preferably has a hollow shell structure, that is, a hermetically sealing structure completely covering the housing part 11. The frame structure part 12, however, does not necessarily have a hermetically sealing structure. As the frame structure part 12 is subjected to larger force at the time of the increase of the volume of the volume change part 13 housed in the housing part 11, the amount of deformation described below of the frame structure part 12 can be increased by a portion of the frame structure part 12 being pressed by the force and thus deformed in an inclined manner.

In the unit structure, the portion constituting the frame structure part 12 is preferred to be chemically bonded and thus continuous but is not necessarily chemically bonded. In the material constituting the actuator 1, a plurality of frame structure parts 12 are three-dimensionally connected to each other. The plurality of frame structure parts 12 are preferred to be chemically bonded with each other and thus continuous but are not necessarily chemically bonded with each other.

The volume change part 13 is surrounded by the frame structure part 12. The volume change part 13 increases the volume thereof by external input of external energy except mechanical energy. Examples of the external energy include heat energy, electric energy, chemical energy, and optical energy. For example, the input of heat energy is increasing the temperature of the actuator to a higher temperature. When the amount of increase in the volume by the input of external energy is compared between the volume change part 13 and the frame structure part 12 under the same conditions, the volume change part 13 has a larger amount of increase in the volume than the amount of increase in the volume of the frame structure part 12.

The housing part 11 has a shape that is, in each direction, anisotropic with regard to the direction of the maximum width of the housing part 11, that is, a shape other than a sphere. That is, the housing part 11 has an anisotropic shape, with a maximum width LD2 in a first direction of the housing part 11 longer than a maximum width LD3 in second direction different from the first direction of the housing part 11. For example, as illustrated on the left in FIG. 2, when the housing part 11 has a sectional shape of a prolate spheroid, a longer direction D2 corresponds to the first direction, and a shorter direction D3 perpendicular to the longer direction corresponds to the second direction. In addition, the longer direction D2 is a direction along the fiber axis direction D1 in FIG. 1.

As illustrated on the left in FIG. 2, the volume change part 13 is housed in the housing part 11 of the frame structure part 12 and the shape of the housing part 11 has an anisotropic shape other than a sphere, before the input of external energy. The volume change part 13 is disposed in advance so that the expansion direction of the volume change part 13 at the time of the input of energy becomes the shorter direction D3. The volume change part 13 is expanded in the shorter direction D3 at the time of the input of external energy into the frame structure part 12 and the volume change part 13. Then, the volume change part 13 has a larger amount of change in the volume by the input of external energy than the amount of change in the volume of the frame structure part 12. Accordingly, the frame structure part 12 is pressed outward in the shorter direction D3 and thus widened, while contracted in the longer direction D2.

Therefore, as illustrated on the right in FIG. 2, the increase of the volume of the volume change part 13 deforms the frame structure part 12 in a direction of making the shape of the housing part 11 closer to a sphere. That is, the increase of the volume of the volume change part 13 deforms the frame structure part 12 to contract the housing part 11 in the longer direction D2 and widen the housing part 11 in the shorter direction D3. In other words, the volume change part 13 is expanded in a direction perpendicular to the fiber axis direction D1. A portion of the frame structure part 12 moves in the direction perpendicular to the fiber axis direction D1 in cooperation with the volume change part 13 along with the expansion of the volume change part 13. Another portion of the frame structure part 12 moves in a direction allowing the volume change part 13 to be contracted in the fiber axis direction D1. Thus, the volume change part 13 is not expanded isotropically but is contracted in the first direction and expanded in the second direction. That is, the volume change part 13 comes to have anisotropy in the change of the volume thereof.

In order to attain high output of the actuator 1, that is, in order to allow the actuator 1 to be contracted by more when the actuator 1 performs the action of externally imparting tensile force, it is necessary to use a material having both a property of generating a large distortion by input of external energy and a property of having a high Young's modulus. Materials having a high Young's modulus, however, generally generate small distortion. Whereas materials that generate large distortion have a low Young's modulus. Therefore, there has been conventionally no material having both these properties.

In order to counter this problem, using the material having the unit structures 10 for the actuator 1 enables the actuator 1 to have a higher Young' modulus than the Young's modulus of the actuator 1 including only the material constituting the volume change part 13.

When including only the material constituting the frame structure part 12, the actuator 1 has a small amount of change in the volume at the time of input of external energy and generates a small distortion (that is, amount of deformation). Also, when including only the material constituting the volume change part 13, the actuator 1 is isotropically expanded at the time of input of external energy to generate a small distortion.

The material having the unit structures 10, however, allows the volume change part 13 to increase the volume thereof by input of external energy into the volume change part 13. The increase of the volume of the volume change part 13 deforms the frame structure part 12 to contract the housing part 11 in the first direction and widens the housing part 11 in the second direction. This mechanism enables the actuator 1 to increase distortion generated at the time of input of external energy, compared to the actuator 1 including only the material constituting the frame structure part 12 and the actuator 1 including only the material constituting the volume change part 13.

Thus, the actuator 1 is enabled to have both the property of generating large distortion by input of external energy and the property of having a high Young's modulus. Accordingly, the actuator 1 is enabled to attain high output.

In the actuator 1, the contraction action in the first direction of the housing part 11 can be used for the output of the actuator 1. The output, however, is not limited to the use of the contraction action, and the expansion action in the second direction of the housing part 11 can also be used for the output of the actuator 1.

Next, a PA12 (that is, polyamide 12) fiber material that has embodied the above-described material design is described. The fiber material is, as described below, manufactured by drawing a fiber in a process for manufacturing the PA12 fiber material. PA12 is a polyamide-based crystalline polymer material having a crystalline portion and an amorphous portion. The polymer material refers to a polymer organic compound. Examples of the polyamide-based crystalline polymer material include, in addition to PA12, PA6 (that is, polyamide 6) and PA66 (that is, polyamide 66).

The fiber material (hereinafter, this fiber material is called a polyamide-based fiber material) formed of the polyamide-based crystalline polymer material manufactured by drawing a fiber has a bulk structure 20 illustrated in FIG. 3.

Figure 3:
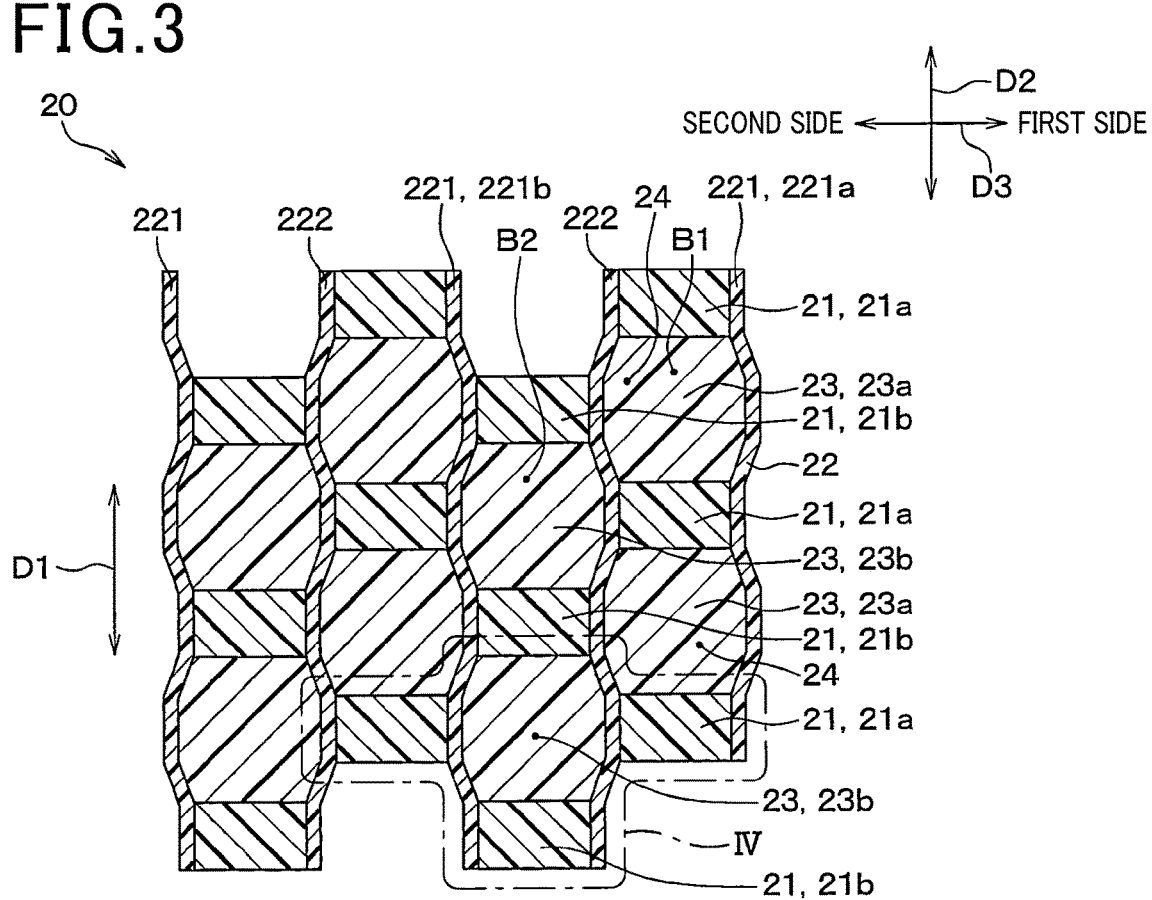
FIG. 3 is a diagram illustrating a model of a bulk structure of a polyamide-based fiber material.

Specifically, the polyamide-based fiber material includes, as illustrated in FIG. 3, a plurality of crystalline portions 21, a plurality of tie molecule domain 22, and a plurality of amorphous portions 23. The plurality of crystalline portions 21 are portions in which polymer chains are regularly arranged. Specifically, the plurality of crystalline portions 21 are portions of crystal lamellae. The plurality of tie molecule domains 22 are portions in which polymer chains extend to connect the plurality of crystalline portions 21 to each other. The plurality of crystalline portions 21 and the plurality of tie molecule domains 22 form frame structures surrounding a plurality of housing parts 24. The plurality of amorphous portions 23 are portions in which polymer chains are irregularly arranged. The plurality of amorphous portions 23 are housed in the plurality of housing parts 24. That is, the plurality of amorphous portions 23 are closed in portions surrounded by the plurality of crystalline portions 21 and the plurality of tie molecule domains 22.

Figure 4:
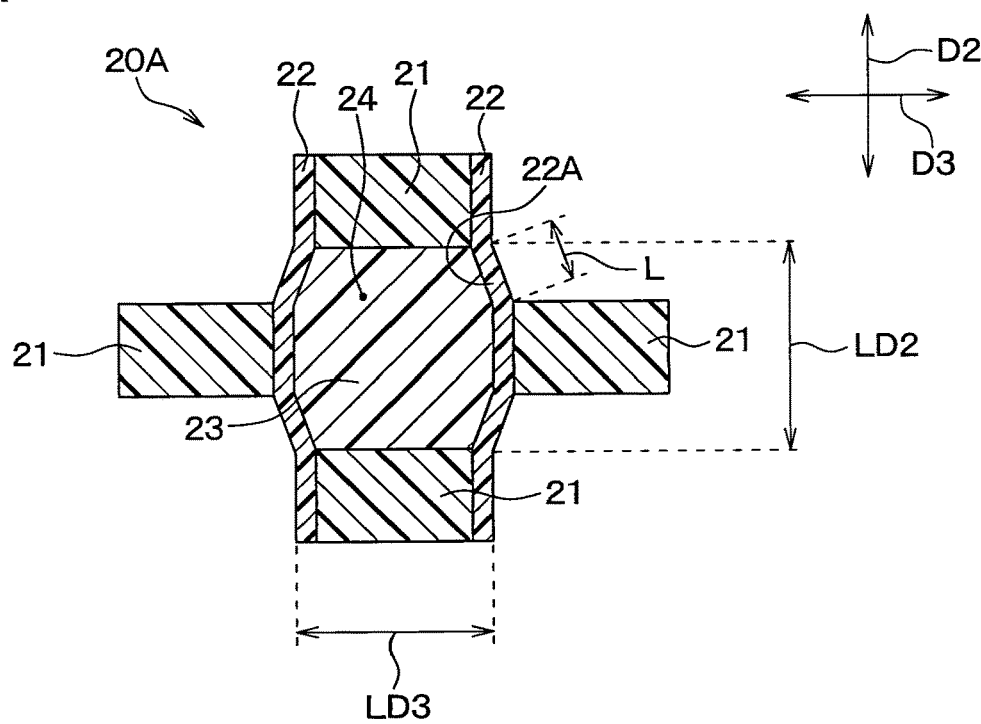
FIG. 4 is an enlarged view of a part IV shown in FIG. 3 and is a diagram illustrating a model of a unit structure of the polyamide-based fiber material.

The bulk structure 20 illustrated in FIG. 3 includes unit structures 20A one of which is illustrated in FIG. 4, that is, the crystalline portions 21, the tie molecule domains 22, and the amorphous portions 23. As illustrated in FIG. 4, a plurality of crystalline portions 21 and a plurality of tie molecule domains 22 form a frame structure surrounding one housing portion 24. Each housing part 24 houses one amorphous portion 23 among the plurality of amorphous portions 23. Accordingly, each amorphous portion 23 among the plurality of amorphous portions 23 corresponds to the volume change part 13 of the unit structure 10 in FIG. 2. A part of the plurality of crystalline portions 21 and the plurality of tie molecule domains 22 that surround each volume change part 13 correspond to the frame structure part 12 of the unit structure 10 in FIG. 2.

A first direction D2 and a second direction D3 in FIGS. 3 and 4 are perpendicular to each other. The first direction D2 is a direction along the fiber axis direction D1. Unit structures 20A adjacent to each other in the second direction D3 are disposed to be positionally shifted in the first direction D2.

That is, as illustrated in FIG. 3, the plurality of tie molecule domains 22 include a plurality of first tie molecule domains 221 extending in the first direction D2 and a plurality of second tie molecule domains 222 extending in the first direction D2. The plurality of first tie molecule domains 221 and the plurality of second tie molecule domains 222 are disposed alternately one by one in the second direction D3.

One second tie molecule domain 222 among the plurality of second tie molecule domains 222 and one first tie molecule domain 221a among the plurality of first tie molecule domains 221 form a first space B1 therebetween, one first tie molecule domain 221a being positioned adjacent to one second tie molecule domain 222 on one side in the second direction D3. One second tie molecule domain 222 and one first tie molecule domain 221b form a second space B2 therebetween, one first tie molecule domain 221b being position adjacent to one second tie molecule domain 222 on the other side in the second direction D3.

The plurality of crystalline portions 21 include a plurality of first crystalline portions 21a disposed in the first space B1. The plurality of amorphous portions 23 include a plurality of first amorphous portions 23a disposed in the first space B1. The plurality of first crystalline portions 21a and the plurality of first amorphous portions 23a are disposed in the first space B1 alternately one by one in the first direction D2.

The plurality of crystalline portions 21 include a plurality of second crystalline portions 21b disposed in the second space B2. The plurality of amorphous portions 23 include a plurality of second amorphous portions 23b disposed in the second space B2. The plurality of second crystalline portions 21b and the plurality of second amorphous portions 23b are disposed in the second space B2 alternately one by one in the first direction D2.

Each first crystalline portion 21a among the plurality of first crystalline portions 21a in the first spaces B1 faces, in the second direction D3, one second amorphous portion 23b among the plurality of second amorphous portions 23b in the second spaces B2. That is, when one first crystalline portion 21a is projected in the second direction D3 on the one second amorphous portion 23b, the projected one first crystalline portion 21a overlaps the one second amorphous portion 23b. One second crystalline portion 21b among the plurality of second crystalline portions 21b in the second space B2 is faces, in the second direction D3, one first amorphous portion 23a among the plurality of first amorphous portions 23a in the first spaces B1. That is, when one second crystalline portion 21b is projected in the second direction D3 on the one first amorphous portion 23a, the projected one second crystalline portion 21b overlaps the one first amorphous portion 23a.

Thus, the position in the first direction D2 of each first crystalline portion 21a among the plurality of first crystalline portions 21a is different from the position in the first direction D2 of a second crystalline portion 21b among the plurality of second crystalline portions 21b. The position in the first direction D2 of each first amorphous portion 23a among the plurality of first amorphous portions 23a is different from the position in the first direction D2 of a second amorphous portion 23b among the plurality of second amorphous portions 23b. That is, each second crystalline portion 21b is disposed at a position in the second space B2 that is the same in the first direction D2 as the position of a first amorphous portion 23a in the first space B1.

The plurality of amorphous portions 23 are each longer in the first direction D2 than the crystalline portions 21 are. Therefore, the plurality of tie molecule domains 22 each include a crystal connection portion 22A that is a portion positioned between a first crystalline portion 21a and a second crystalline portion 21b among the plurality of crystalline portions 21, the first crystalline portion 21a and the second crystalline portion 21b having a shortest-distance positional relationship in the first direction D2, and that connects the first crystalline portion 21a to the second crystalline portion 21b. The crystal connection portion 22A is adjacent to both a first amorphous portion 23a and a second amorphous portion 23b in the second direction D3. The crystal connection portion 22A is inclined with respect to the first direction D2 but may be parallel with the first direction D2.

During volume expansion of the amorphous portions 23, the outer peripheral surfaces of the amorphous portions 23 that have been expanded in the second direction D3 press the inner peripheral surfaces of the tie molecule domains 22 in the same direction as the expansion direction. The expansion direction is the second direction D3. The tie molecule domains 22, the crystalline portions 21, and the amorphous portions 23 are disposed so that the crystalline portions 21 that form the frame structures together with the tie molecule domains 22 press the amorphous portions 23 in the first direction D2 along with the deformation of the pressed tie molecule domains 22 to contract the amorphous portions 23 in the first direction D2.

As illustrated in FIG. 4, the section obtained by cutting the bulk structure 20 so as to include the extension direction of the tie molecule domains 22 shows that one housing part 24 has an octagon shape as its sectional shape. The one housing part 24 has a lager maximum width LD2 in the first direction D2 than a maximum width LD3 in the second direction D3. The first direction D2 is the longer direction of the one housing part 24. The first direction D2 corresponds to the first direction of the housing part 11 in FIG. 2. The second direction D3 is the shorter direction of the one housing part 24. The second direction D3 corresponds to the second direction of the housing part 11 in FIG. 2.

The amorphous portions 23 are formed from randomly entangled polymer chains. These polymer chains mainly extend in the first direction D2. That is, the extension direction of the polymer chains in the amorphous portions 23 is along the fiber axis direction D1. Therefore, the plurality of amorphous portions 23 each increase the total volume thereof to be contracted in the first direction D2, thus allowing the actuator 1 having the bulk structure 20 to be contracted in the fiber axis direction D1.

When the actuator 1 is heated to input heat energy into the amorphous portions 23, the amorphous portions 23 increase their total volume. When the actuator 1 is cooled to release the heat energy from the amorphous portions 23, the amorphous portions 23 decrease their total volume. That is, the input of heat and the change of the volume are performed reversibly.

Figure 5:
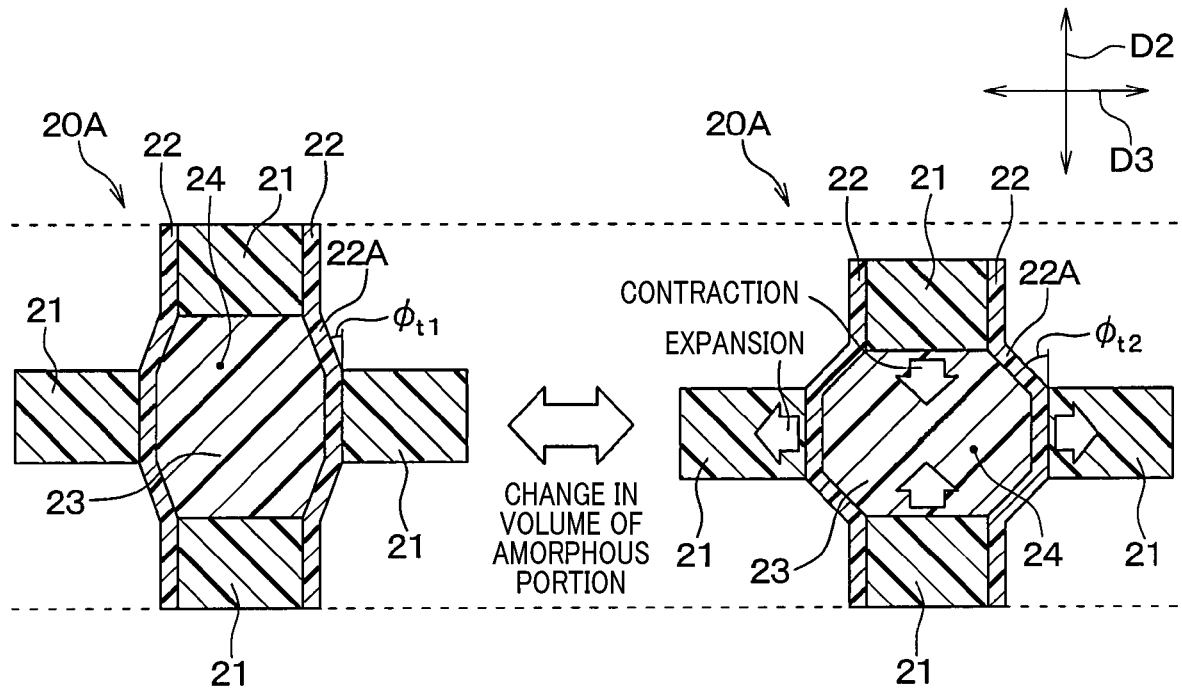
FIG. 5 is a diagram illustrating the model of the unit structure of the polyamide-based fiber material and illustrating a shape change of the unit structure by a change in the volume of an amorphous portion.

The contraction of the actuator 1 in the fiber axis direction D1 by heating will be described. The diagram on the left in FIG. 5 illustrates the unit structure 20A when the amorphous portion 23 has a small volume. That is, the diagram on the left in FIG. 5 illustrates the unit structure 20A in a state in which the actuator 1 has not been heated. This state is a natural state in which the amorphous portion 23 is not volume-expanded. In this state, the tie molecule domains 22 in contact with the amorphous portion 23 are not subjected to force making the tie molecule domains 22 move in the expansion direction. Therefore, an angle $\varphi_{t1}$ of each of the tie molecule domains 22 is small. Here, as illustrated in FIG. 4, the length of the outer side of the crystal connection portion 22A of the tie molecule domain 22 is defined as L. With this definition, the length in the first direction D2 of the crystal connection portion 22A of the tie molecule domain 22 is $L \cos \varphi_{t1}$.

The diagram on the right in FIG. 5 illustrates the unit structure 20A when the amorphous portion 23 has a large volume. In this state, the tie molecule domain 22 is pressed along with the expansion of the amorphous portion 23 to be deformed, so that an angle $\varphi_{t2}$ of the tie molecule domain 22 is large. The length in the first direction D2 of the crystal connection portion 22A of the tie molecule domain 22 in this state is $L \cos \varphi_{t2}$. The angles $\varphi_{t1}$ and $\varphi_{t2}$ of the tie molecule domain are angles of the crystal connection portion 22A with respect to the first direction D2.

When the amorphous portion 23 increases the total volume thereof, the unit structure 20A changes shape from the shape on the left in FIG. 5 to the shape on the right in FIG. 5. Then, the crystal connection portion 22A of the tie molecule domain 22 decreases the length thereof in the first direction D2 from $L \cos \varphi_{t1}$ to $L \cos \varphi_{t2}$. That is, as illustrated on the right in FIG. 5, the amorphous portion 23 is contracted in the first direction D2 and expanded in the second direction D3. Further in other words, the frame structure part formed of the crystalline portions 21 and the tie molecule domains 22 are deformed to contract the housing part 24 in the first direction D2 and widen the housing part 24 in the second direction. The first direction D2 corresponds to the first direction and the second direction D3 corresponds to the second direction. Thus, the unit structure 20A imparts anisotropy to the change in the volume of the amorphous portion 23.

On the other hand, when the amorphous portion 23 decreases the total volume thereof, the unit structure 20A changes the shape thereof from the shape on the right in FIG. 5 to the shape on the left in FIG. 5.

A fiber material formed of a general crystalline polymer material is known to have a structure including crystalline portions and amorphous portions alternately connected to each other. In addition, the fiber material formed of the crystalline polymer material is conventionally and generally considered to cause heat contraction due to entropic elasticity of the amorphous portions.

Figure 6:
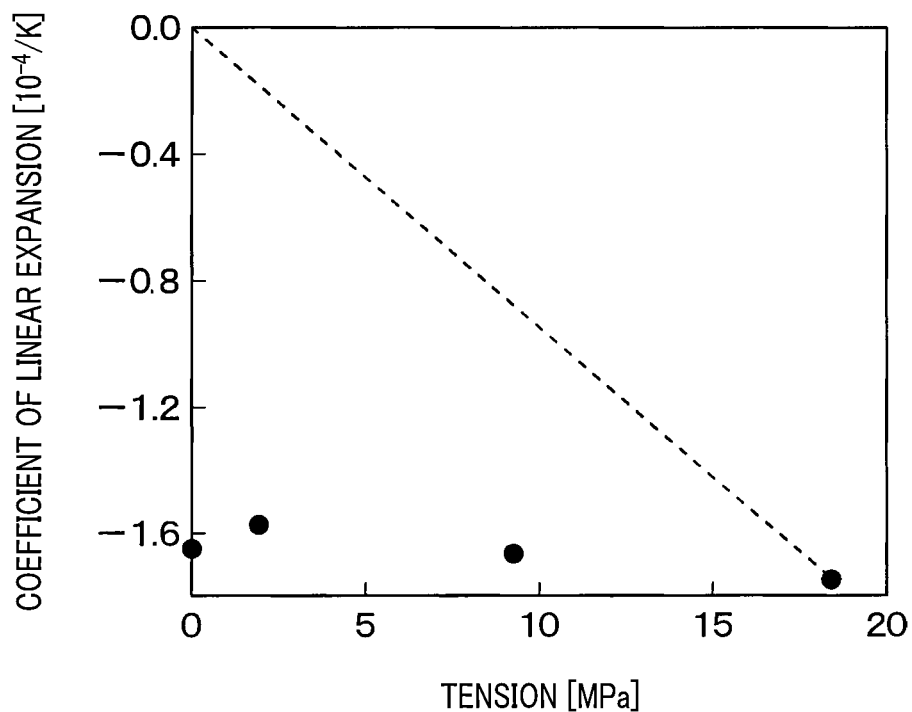
FIG. 6 is a graph illustrating a relationship between the magnitude of tension applied to a PA6 fiber material and the coefficient of linear expansion of the PA6 fiber material.
Figure 7:
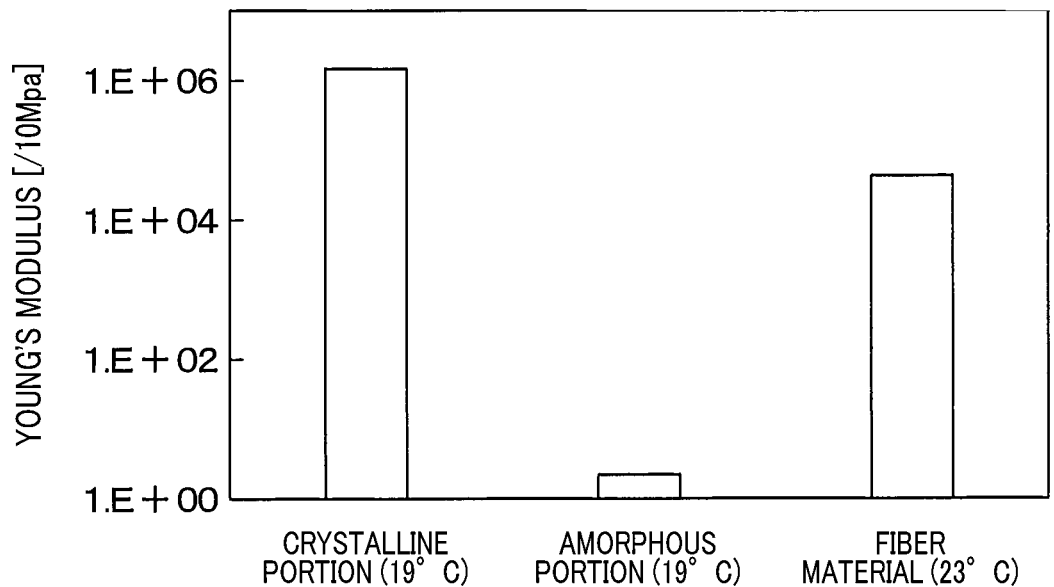
FIG. 7 is a graph illustrating the Young's modulus of each of a crystalline portion and an amorphous portion of PA6 and the Young's modulus of a PA6 fiber material.

In the polyamide-based fiber material, however, the phenomenon attributed to the entropic elasticity is not observed in some cases. Specific cases include no increase in the amount of contraction (that is, coefficient of linear expansion) at the time of applying tension in the fiber axis direction to the polyamide-based fiber material as illustrated in FIG. 6 and a large difference in Young's modulus between the amorphous portions and the fiber material as illustrated in FIG. 7. The circles in FIG. 6 represent actually measured values of the coefficient of linear expansion. The dashed line in FIG. 6 represents estimated coefficients of linear expansion attributed to the entropic elasticity. The sample used in the measurement of FIG. 6 has a diameter of 0.37 mm.

In consideration of the fact that the contraction of the polyamide-based fiber material is caused by the unit structure 20A illustrated in FIG. 4, the unit structure 20A imparting anisotropy to the change in the volume of the amorphous portion 23, a reason why the phenomenon attributed to the entropic elasticity is not observed can be explained. That is, the change in the volume of the enclosed amorphous portion 23 changes the angles $\varphi_{t1}$ and $\varphi_{t2}$ of the tie molecule domain 22 as illustrated in FIG. 5 to allow the bulk structure 20 to exert anisotropy in the change of the volume thereof. In this case, the contraction of the polyamide-based fiber material is caused not by the entropic elasticity but by expansion of free volume. Therefore, the fiber material does not change the amount of contraction at the time of applying tension as illustrated in FIG. 6 even when the magnitude of the tension applied is varied. In addition, the Young's modulus of the polyamide-based fiber material depends on the Young's modulus of not the amorphous portion 23 but of the tie molecule domain 22. Therefore, as illustrated in FIG. 7, the PA6 fiber material has a value of the Young's modulus between the Young's modulus of the crystalline portion 21 and the Young's modulus of the amorphous portion 23.

Next, a basis of the fact that the polyamide-based fiber material has the unit structure 20A is described. The fact that the polyamide-based fiber material has the unit structure 20A is proven by a calculated value and an actually measured value of the coefficient of linear expansion of the polyamide-based fiber material being the same or close to each other, the calculated value being obtained by geometric calculation of the unit structure 20A.

The coefficient of linear expansion of the polyamide-based fiber material is calculated using Mathematical Equations 1, 2, and 3 below. Mathematical Equations 1, 2, and 3 are derived by analysis based on a model of the unit structure 20A.

$$\frac{\Delta L_1}{L_1 \Delta T} = -\frac{3\sin\phi_t \left(\sin 2\phi_t + 2\left(\frac{L_w}{L_t}\right)\cos\phi_t + 2\left(\frac{L_c}{L_t}\right)\sin\phi_t + \left(\frac{L_w}{L_t}\right)\left(\frac{L_c}{L_t}\right)\right)}{2\left(\left(\frac{L_c}{L_t}\right) + \cos\phi_t\right)\left(\cos 2\phi_t - \left(\frac{L_w}{L_t}\right)\sin\phi_t + \left(\frac{L_c}{L_t}\right)\cos\phi_t\right)} \alpha_a$$

Figure 8:
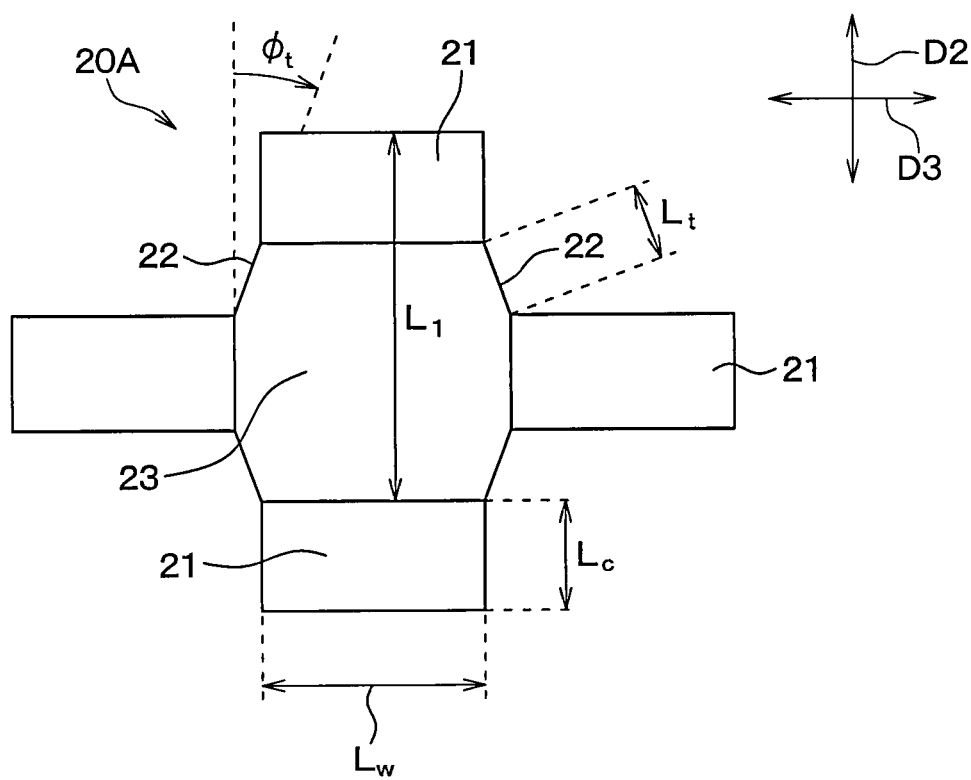
FIG. 8 is a diagram illustrating a model of a unit structure of a polyamide-based fiber material.

In Mathematical Equation 1, $\Delta L_1/(L_1 \Delta T)$ is the coefficient of linear expansion in the first direction D2. The symbols in Mathematical Equation 1 are the dimensions and the angle of the constituent elements in the unit structure 20A illustrated in FIG. 8. L1 represents the length in the first direction D2 of a part of the unit structure 20A. $\Delta L_1$ represents the amount of change in $L_1$. $\Delta T$ represents the amount of change in the temperature. $L_t$ represents the length of the crystal connection portion 22A of the tie molecule domain 22. $\varphi_t$ represents the angle of the tie molecule domain 22 and the angle of the crystal connection portion 22A with respect to the first direction D2. $\alpha_a$ represents the coefficient of linear expansion of the amorphous portion 23. $L_c$ represents the length in the first direction D2 of the crystalline portion 21. $L_w$ represents the length in the second direction D3 of the crystalline portion 21. The reciprocal of $L_w/L_t$ in Mathematical Equation 1 is represented by Mathematical Equation 2 below.

$$\frac{L_t}{L_w} = \frac{1}{2\cos\phi_t \sin\phi_t} =$$

$$\left(\sqrt{\cos^2\phi_t + \left(\frac{L_c}{L_w}\right)^2 \sin^2\phi_t + 2\left(\frac{L_c}{L_w}\right)\cos\phi_t \sin\phi_t \left(\frac{1}{X_c} - 1\right)} - \cos\phi_t - \left(\frac{L_c}{L_w}\right)\sin\phi_t\right)$$

In Mathematical Equation 2, $L_c/L_w$ represents the aspect ratio of the crystalline portion 21. $X_c$ represents the degree of crystallization of polyamide. $L_c/L_t$ in Mathematical Equation 1 represents, as shown in Mathematical Equation 3 below, the product of the aspect ratio of the crystalline portion 21 and the value of the reciprocal of Mathematical Equation 2.

$$\frac{L_c}{L_t} = \frac{L_c}{L_w} \frac{L_w}{L_t} \qquad \text{[Mathematical Equation 3]}$$

Four parameters, the coefficient of linear expansion $\alpha_a$ of the amorphous portion 23, the angle $\varphi_t$ of the tie molecule domain 22, the aspect ratio ($L_c/L_w$) of the crystalline portion 21, and the degree of crystallization $X_c$ are necessary for the theoretical calculation of the coefficient of linear expansion using Mathematical Equations 1, 2, and 3.

Figure 9:
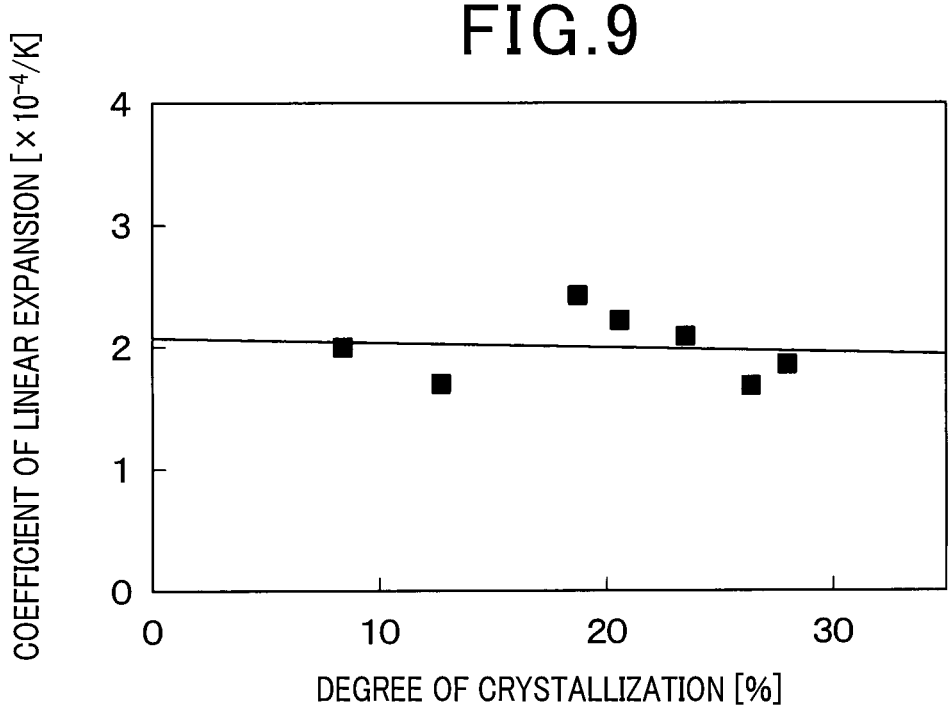
FIG. 9 is a graph illustrating a relationship between the degree of crystallization and the coefficient of linear expansion of PA6.

The coefficient of linear expansion $\alpha_a$ of the amorphous portion 23 is extrapolated from the relationship between the degree of crystallization and the coefficient of linear expansion as illustrated in FIG. 9. FIG. 9 illustrates a graph in which actually measured values of the coefficient of linear expansion of PA6 materials having different degrees of crystallization are plotted. From these plotted values, the relationship between the degree of crystallization and the coefficient of linear expansion is obtained. This relationship allows the coefficient of linear expansion at a degree of crystallization of 0% to be calculated. The calculated coefficient of linear expansion of the amorphous portion 23 in PA6 was $2.064 \times 10^{-4}$/K.

The angle $\varphi_t$ of the tie molecule domain 22 is obtained from a measurement result by small-angle X-ray scattering. The angle $\varphi_t$ of the tie molecule domain 22 in PA6 was 30 degrees or less.

The aspect ratio of the crystalline portion 21 is obtained from a measurement result by wide-angle X-ray scattering. The aspect ratio of the crystalline portion 21 in PA6 was 1.83.

The degree of crystallization $X_c$ is obtained from a measurement result by DSC (that is, differential scanning calorimeter). Specifically, the degree of crystallization $X_c$ is obtained using the calculation equation for the degree of crystallization represented below, a measured value of the amount of heat of fusion, and the amount of heat of fusion of a 100% crystalline body. As the amount of heat of fusion of the 100% crystalline body, a measured value or a literature-based value is used.

Degree of crystallization=(measured value of amount of heat of fusion/amount of heat of fusion of 100% crystalline body)×100

The measured value of the amount of heat of fusion of PA6 was 60.9 mJ/mg. According to data from TA instruments, the amount of heat of fusion of the 100% crystalline body of PA6 is 230 mJ/mg. The degree of crystallization $X_c$ obtained using these values was 26.5%.

Figure 10:
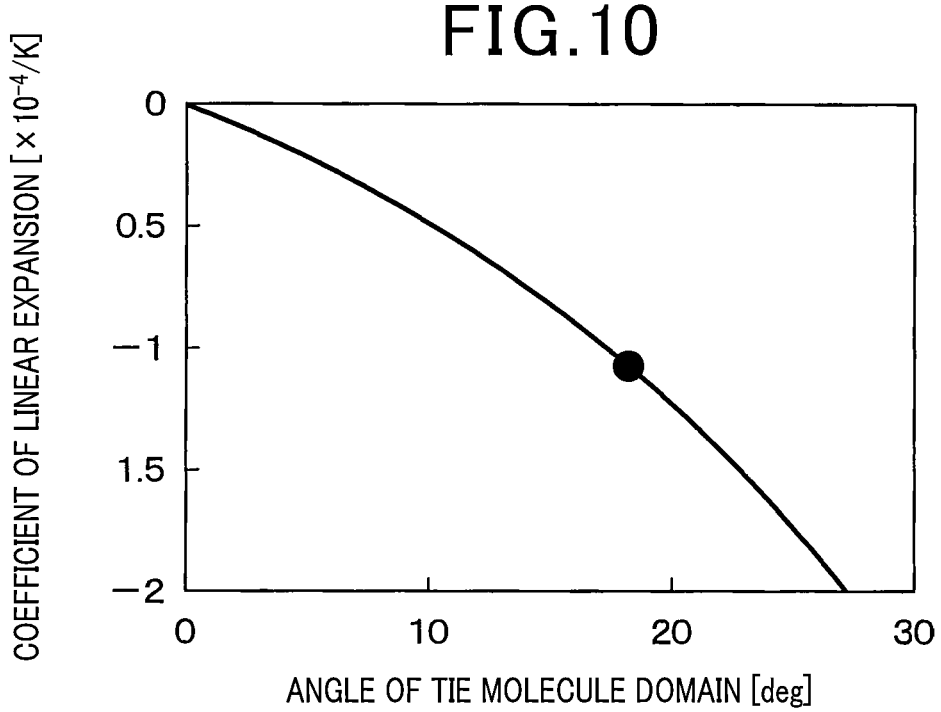
FIG. 10 is a graph illustrating a calculated result and an actually measured value of the coefficient of linear expansion of a PA6 fiber material.

When the coefficient of linear expansion of PA6 is calculated using these values of the parameters, a value close to the actually measured value was obtained as illustrated in FIG. 10. The curve in FIG. 10 represents calculated values of the coefficient of linear expansion of PA6 in the range of an angle $\varphi_t$ of the tie molecule domain of 30 degrees or less. The circle in FIG. 10 represents the actually measured value of the coefficient of linear expansion of the PA6 fiber material. Due to this result, the unit structure 20A of the polyamide-based fiber material can be said to be highly probably correct.

Figure 11:
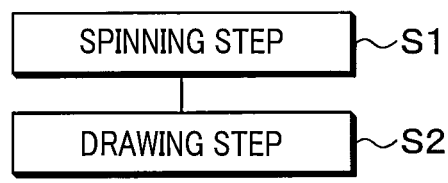
FIG. 11 is a flowchart illustrating a method for manufacturing a PA12 fiber material.

Next, a method for manufacturing the PA12 fiber material according to the present embodiment is described. As illustrated in FIG. 11, the method for manufacturing the PA12 fiber material includes a spinning step S1 and a drawing step S2.

Figure 12:
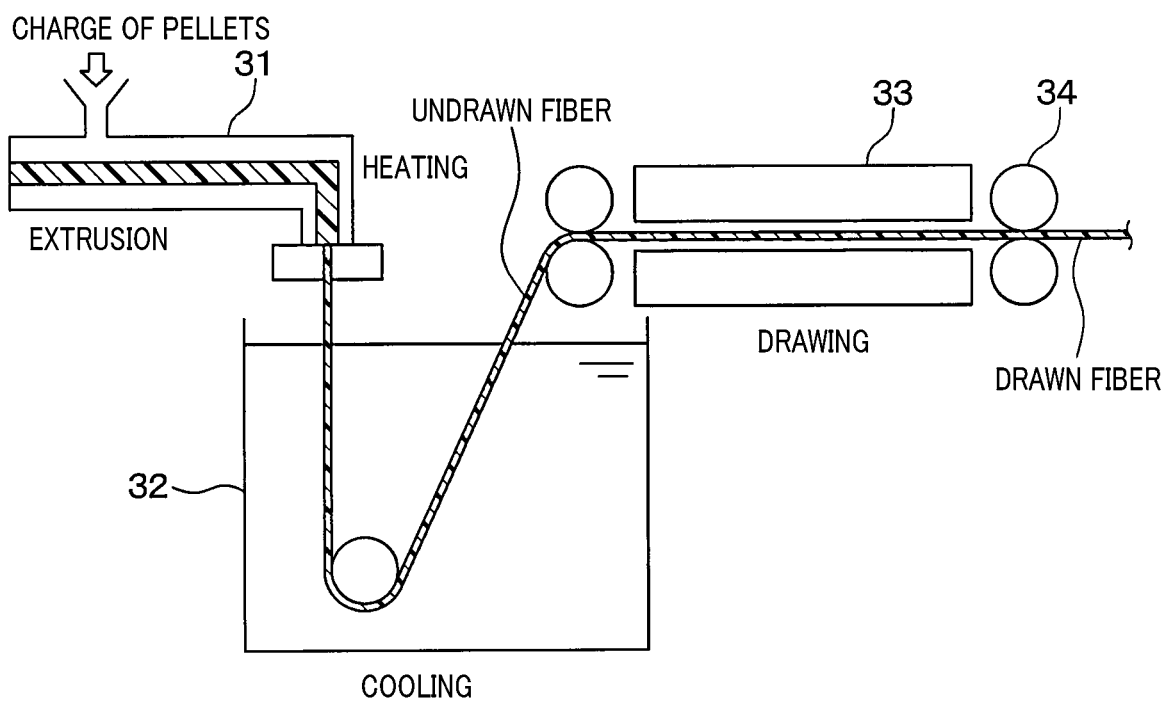
FIG. 12 is a schematic view of an apparatus for manufacturing the PA12 fiber material.

In the spinning step S1, pellets of polyamide 12 are introduced into an extruder 31 as illustrated in FIG. 12. These pellets are heated at the melting point thereof or higher in the extruder 31. The material melted by the heating is extruded through a nozzle to be formed into a fiber and is then cooled by a cooling liquid in a cooling tank 32 to be solidified. Thus, an undrawn fiber of the polyamide 12 is formed by melt spinning.

Subsequently, in the drawing step S2, the undrawn fiber is, as illustrated in FIG. 12, drawn by rollers 34 and the like while being heated by a heater 33 at an appropriate temperature (for example, approximately 100° C.) that is the melting point or lower. Appropriately adjusting the heating conditions and the setting of the speed of the rollers 34 allows the draw ratio of this undrawn fiber to be set at, for example, three times, four times, or five times. This drawing step gives anisotropy to the shape of each of the plurality of housing parts 24. The longer direction of each of the plurality of housing parts 24 is a direction along the fiber axis direction D1.

Thus, the PA12 fiber material that has been drawn is manufactured. That is, the unit structure 20A is obtained through the spinning step S1 and the drawing step S2. When the drawing step S2 is not performed, the undrawn fiber does not have the unit structure 20A illustrated in FIG. 4 in some cases.

Next, an experimental result obtained by comparing the PA12 fiber material that has been drawn, with the PA6, PA66, and PA610 fiber materials that have been drawn is described. As described in U.S. Pat. No. 9,784,249, there are conventional actuators respectively including PA6 and PA66 fiber materials. Accordingly, the PA6 and PA66 fiber materials used here correspond to the conventional actuators.

Figure 13:
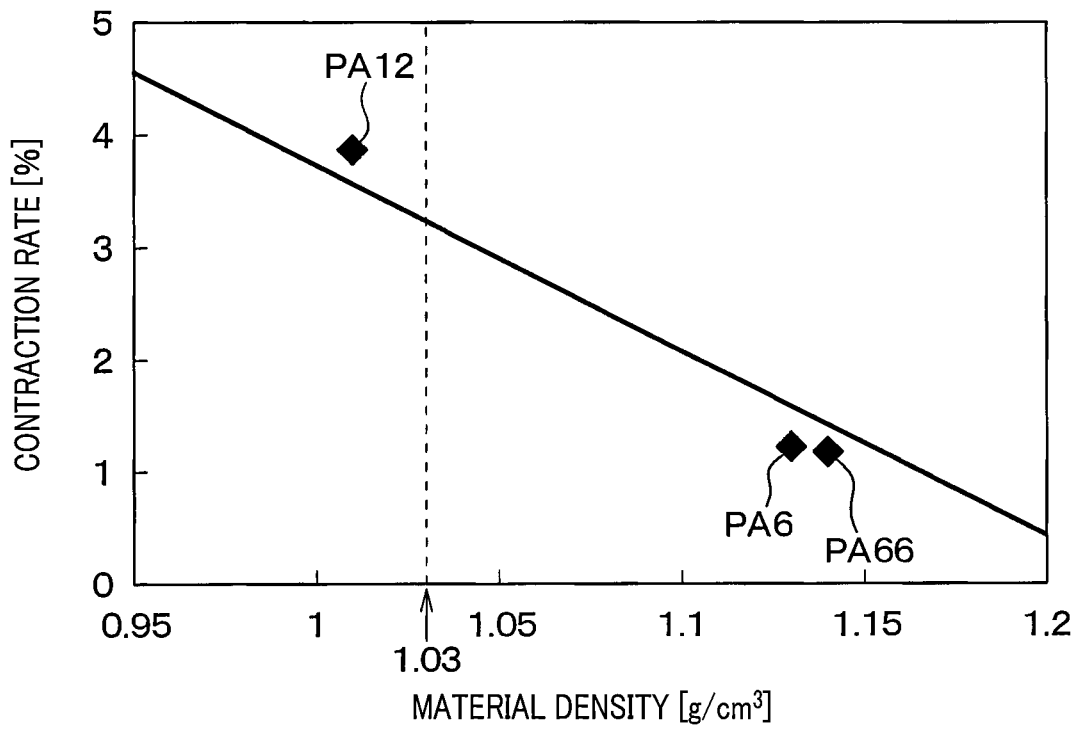
FIG. 13 is a graph illustrating a measured result of the contraction rate of PA12, PA6, and PA66 fiber materials manufactured at the same draw ratio.

A PA12 fiber material, a PA6 fiber material, and a PA66 fiber material were manufactured by the manufacturing method described above. The spinning temperature of PA12 was 210° C. The spinning temperature of PA6 was 260° C. The spinning temperature of PA66 was 285° C. The maximum draw ratio of each of PA6 and PA66 was four times. Therefore, with the draw ratio set at the same four times, the PA12, PA6, and PA66 fiber materials were manufactured. Then, the contraction rate of each of the manufactured fiber materials was measured. In the measurement of the contraction rate, measured was the contraction rate of each of the samples when the sample was heated from 30° C. to 150° C. under no application of tension to the sample. FIG. 13 illustrates a measurement result.

FIG. 13 illustrates a relationship between the contraction ratio and the material density of each of the fiber materials. The material density is true density. The material density of each of the fiber materials is a value measured by a measurement method specified in JIS K 7112. The line in FIG. 13 is an estimated result of the contraction rate by a theoretical model. The Young's moduli of the PA12, PA6, and PA66 fiber materials are values close to each other.

According to the theoretical model of the unit structure 20A, as understood from Mathematical Equation 1, the amount of contraction of the fiber material is proportional to the coefficient of linear expansion $\alpha_a$ of the amorphous portion 23. That is, the higher the coefficient of linear expansion of the amorphous portion 23 is, the larger the amount of contraction of the fiber material is. The expansion of the amorphous portion 23 is attributed to expansion of free volume. Therefore, the coefficient of linear expansion $\alpha_a$ of the amorphous portion 23 is correlated with the material density of the amorphous portion 23. That is, the lower the material density of the amorphous portion 23 is, the higher the coefficient of linear expansion of the amorphous portion 23 is. Accordingly, use of a material that includes the amorphous portion 23 having a low material density can increase the amount of contraction of the fiber. In the polyamide-based fiber material, the proportion of the amorphous portion 23 to the entire material is generally higher than the proportion of the crystalline portion 21 to the entire material. Therefore, there is a correlationship in the material density between the amorphous portion 23 and the entire material. Accordingly, use of a fiber material having a lower material density can increase the amount of contraction of the fiber.

From the measurement result in FIG. 13, it is understood that as per the above-described theory, the fiber material of PA12 having a lower material density than the material density of each of PA6 and PA66 exhibits a higher contraction rate than the contraction rate of each of the PA6 and PA66 fiber materials. Accordingly, as illustrated by the line in FIG. 13, it is understood that there is a relationship in which the contraction rate of the fiber material is increased as the material density of the fiber material is lower.

Further, as described in Proceedings of JSPE Spring Conference Academic Lecture 2017, The Japan Society for Precision Engineering, No. 171, p. 172, there are conventional actuators including a PA11 fiber material. The material density of PA11 is 1.03 g/cm$^3$. The material density of PA12 is 1.01 g/cm$^3$ and is lower than the material density of PA11. Since, as described above, there is the relationship in which the contraction rate of the fiber material is increased as the material density of the fiber material is lower, the PA12 fiber material is presumed to have a larger contraction rate than the contraction rate of the PA11 fiber material.

Accordingly, it is preferred that the actuator 1 includes the PA12 fiber material. When the actuator 1 includes the PA12 fiber material, the PA12 fiber material may or may not contain another material.

In the embodiment described above, the PA12 fiber material has been described as the material that embodies the above-described material design. The material that embodies the material design, however, may be a fiber material made from a polyamide resin other than PA12. The polyamide resin is a synthetic resin having an amide bond. The inventors of the present invention have found the relationship in which the contraction rate of the fiber material is increased as the material density of the fiber material is lower, as described above and as illustrated by the line in FIG. 13. Therefore, the fiber material made from a polyamide resin other than PA12 should have a lower material density than the material densities of polyamide resin fiber materials used for conventional actuators. When the material densities of PA6, PA66, and PA11 are compared with each other, PA11 has the lowest material density. Therefore, the fiber material constituting the actuator 1 should be a fiber material of a polyamide resin having a density of higher than 0 g/cm$^3$ but lower than 1.03 g/cm$^3$. This condition enables the actuator 1 to attain high output, compared to the conventional actuators respectively including the PA6, PA66, and PA11 fiber materials.

The fiber material constituting the actuator 1 is not limited to cases in which the fiber material is made from a single material of the polyamide resin. The fiber material constituting the actuator 1 may be formed of a polymer material containing the polyamide resin and another polymer material. In conclusion, the fiber material constituting the actuator 1 should be formed of a polymer material containing the polyamide resin. When the fiber material constituting the actuator 1 is formed of a polymer material containing the polyamide resin and another polymer material, the density of the polymer material having the unit structure 20A illustrated in FIG. 4 should satisfy the range described above.

At the time of the effective filing date, polymethyl pentene has been known as a thermoplastic resin having the lowest material density. Polymethyl pentene has a density of 0.83 g/cm$^3$. Therefore, a polymer material having a low material density, such as polymethyl pentene, may be mixed with the polyamide resin to attain a desired density of the polymer material having the unit structure 20A illustrated in FIG. 4. In this case, the mixture polymer material has a material density of higher than 0.83 g/cm$^3$. In consideration of the fact that the lowest density of polymer materials present at the time of filing has been 0.83 g/cm$^3$, when the fiber material constituting the actuator 1 is made from a single material of the polyamide resin, the manufactured fiber material is assumed to have a material density of higher than 0.83 g/cm$^3$.

The fiber material formed of a polymer material that is other than the polyamide resin and has the unit structure 20A illustrated in FIG. 4 is considered to have the relationship in which the contraction rate is increased as the material density is reduced as illustrated by the line in FIG. 13. Therefore, the fiber material constituting the actuator 1 may be formed of at least a thermoplastic and crystalline or semicrystalline polymer material other than the polyamide resin as long as the polymer material has the unit structure 20A illustrated in FIG. 4. The crystalline or semicrystalline polymer material is a polymer material having crystalline portions. Further, the fiber material constituting the actuator 1 may contain a material other than the polymer material. Further, the shape of the material that embodies the above-described material design is not necessarily a fiber, but may be a shape other than the fiber, such as a film.

Second Embodiment

Figure 14:
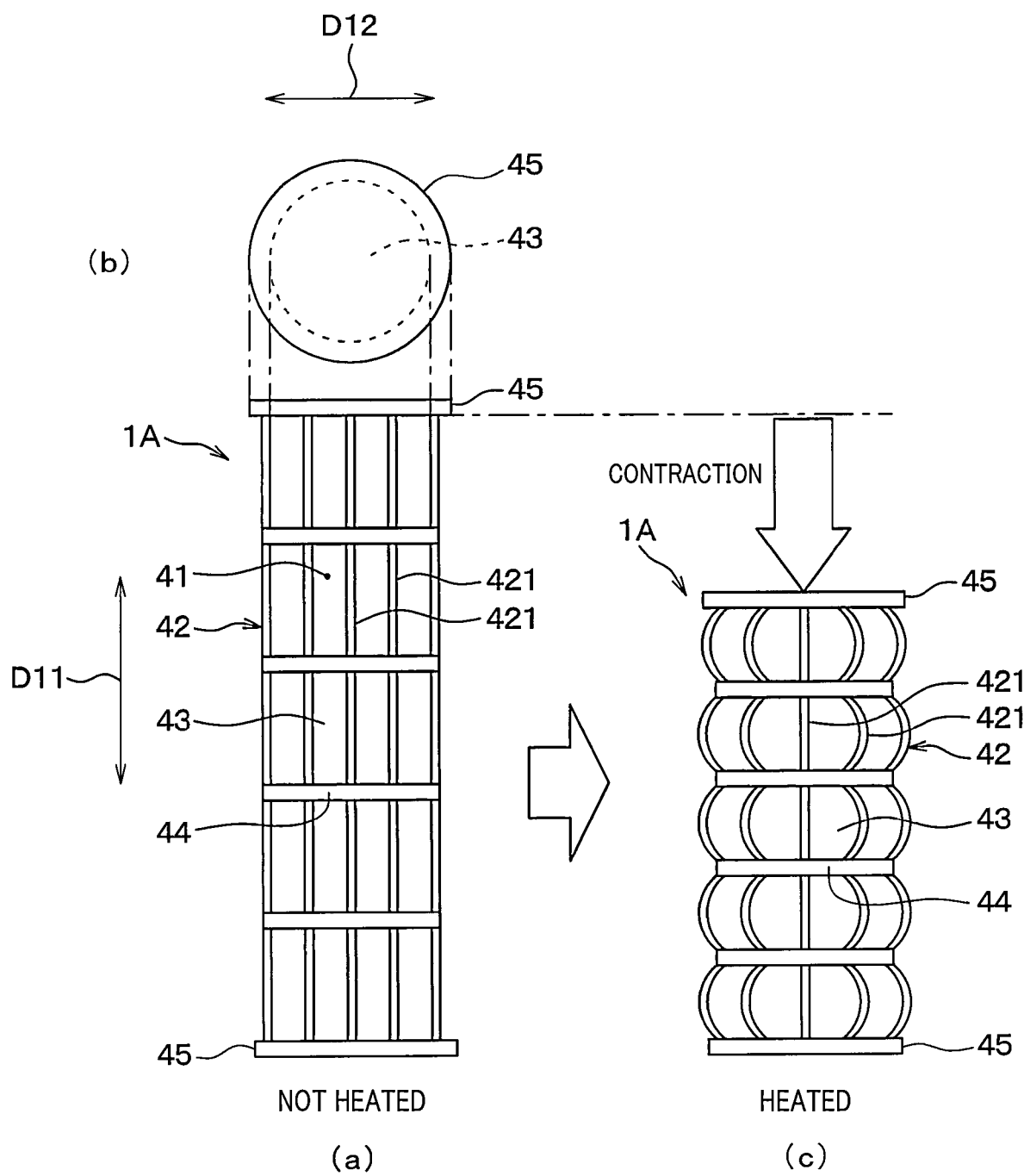
FIG. 14 is a schematic view of an actuator, according to a second embodiment, having joints.

FIG. 14(*a*) is a side view of an actuator 1A according to the present embodiment that has not been heated. FIG. 14(*b*) is a top view of the actuator 1A in FIG. 14(*a*). FIG. 14(*c*) is a side view of the actuator 1A according to the present embodiment that has been heated.

As illustrated in FIGS. 14(*a*), 14(*b*), and 14(*c*), the actuator 1A according to the present embodiment has a fiber shape. That is, the actuator 1A includes a fiber material and is contracted in a fiber axis direction D11 of the fiber material by input of heat energy as external energy. The contraction allows the actuator 1A to output tensile force in the fiber axis direction D11.

The fiber material constituting the actuator 1A includes a braided sleeve 42, a polymer material 43, and a joint 44. The braided sleeve 42 corresponds to the frame structure part 12 in FIG. 2. The polymer material 43 corresponds to the volume change part 13 in FIG. 2.

The braided sleeve 42 has a tubular structure formed by combination of one or more fibers and surrounding a housing part 41 and has a structure of being stretched more easily in a width direction D12 perpendicular to the fiber axis direction D11 than in the fiber axis direction D11. In the braided sleeve 42 that has a cylindrical shape, the width direction D12 is a direction of the diameter of the braided sleeve 42. The housing part 41 in the braided sleeve 42 corresponds to the housing part 11 in the frame structure part 12. As illustrated in FIGS. 14(*a*) and 14(*b*), the braided sleeve 42 has a cylindrical shape but does not necessarily have a cylindrical shape. Examples of the fiber constituting the braided sleeve 42 include a carbon fiber, a metal fiber, a glass fiber, a ceramic fiber, and a polymer fiber.

More specifically, the braided sleeve 42 has a configuration in which a plurality of fibers 421 extending along the fiber axis direction D11 are bundled with an interval provided therebetween. The interval between fibers of the plurality of fibers 421 should be a size not allowing the enclosed polymer material 43 to flow out from the braided sleeve 42. The plurality of fibers 421 are each fixed to the polymer material 43 at both ends of the plurality of fibers 421 by a fixing member 45.

Even when tensile stress in the fiber axis direction D11 is applied to the braided sleeve 42, the plurality of fibers 421 constituting the braided sleeve 42 are not stretched or are less likely to be stretched. When tensile stress in the width direction D12 is applied to the braided sleeve 42, the plurality of fibers 421 constituting the braided sleeve 42 are bent. This mechanism allows the braided sleeve 42 to realize the structure of being stretched more easily in the width direction D12 than in the fiber axis direction D11. The braided sleeve 42 preferably has a structure of not being stretched in the fiber axis direction D11 with respect to the basic shape illustrated in FIG. 14(b) but being stretched in the width direction D12 with respect to the basic shape.

The braided sleeve 42 may have another configuration. For example, the braided sleeve 42 may be a knitted net formed by combination of a plurality of fibers. Alternatively, the braided sleeve 42 may be a knitted net formed from one fiber. When configured to include a knitted net, the braided sleeve 42 has gaps. The size of the gaps should be a size not allowing the enclosed polymer material 43 to flow out from the braided sleeve 42. As long as the braided sleeve 42 has a structure of being stretched more easily in the width direction D12 than in the fiber axis direction D11, the braided sleeve 42 is not necessarily a knitted net.

The polymer material 43 is housed in an internal space of the braided sleeve 42. The polymer material 43 is a solid that is isotropically expanded by input of heat energy when having no restriction to the outer shape thereof. In comparison under the same input conditions of heat energy, the polymer material 43 has a larger amount of increase in the volume than the amount of increase in the volume of the fibers constituting the braided sleeve 42. That is, the polymer material 43 is a material having a higher coefficient of expansion than the coefficient of expansion of the fibers constituting the braided sleeve 42.

As the polymer material 43, an elastomer (that is, an elastic polymer material) is used. Examples of the elastomer include rubber and a thermoplastic elastomer. Examples of the rubber include silicone rubber (for example, PDMS), natural rubber, urethane rubber, acrylic rubber, fluoro-rubber, and NBR. Examples of the thermoplastic elastomer include paraffin and EVA.

The joint 44 suppresses the expansion in the width direction D12 of the braided sleeve 42. The joint 44 has a thinner shape than the outer shape of the braided sleeve 42 and is a yarn-shaped member. The joint 44 is fixed circularly or spirally around the braided sleeve 42 at prescribed intervals.

For example, the joint 44 includes a plurality of circular parts as illustrated in FIG. 14(a). The plurality of circular parts each go around the braided sleeve 42 and are disposed with an interval therebetween in the fiber axis direction D11. Alternatively, the joint 44 may be configured to include one yarn-shaped member that is spirally wound around the braided sleeve 42 at prescribed intervals.

Examples of the material constituting the joint 44 include a carbon fiber, a metal fiber, a glass fiber, a ceramic fiber, and a polymer fiber. The material constituting the joint 44 may be one fiber or a plurality of fibers.

In the actuator 1A according to the present embodiment, the fibers constituting the braided sleeve 42 have a higher Young's modulus than the Young's modulus of the polymer material 43. Therefore, the braided sleeve 42 has a higher Young's modulus than the Young's modulus of the polymer material 43.

In the actuator 1A according to the present embodiment, the actuator 1A is heated and the heat energy is thus input into the polymer material 43 to increase the volume of the polymer material 43. At this time, the increase of the volume of the polymer material 43 widens the braided sleeve 42 in the width direction D12 and contracts the braided sleeve 42 in the fiber axis direction D11 as understood by comparison between FIGS. 14(a) and 14(c). That is, the braided sleeve 42 is deformed to contract the housing part 41 in the fiber axis direction D11 and widen the housing part 41 in the width direction D12. In the present embodiment, the direction along the fiber axis direction D11 corresponds to the first direction. The width direction D12 corresponds to the second direction different from the first direction.

This mechanism enables the actuator 1A to increase distortion generated at the time of input of heat energy, compared to the actuator 1A including only the material constituting the braided sleeve 42 and the actuator 1A including only the polymer material 43.

Thus, also in the present embodiment, the actuator 1A is enabled to have both the property of generating large distortion by input of external energy and the property of having a high Young's modulus. Accordingly, the actuator 1A is enabled to attain high output.

Figure 15:
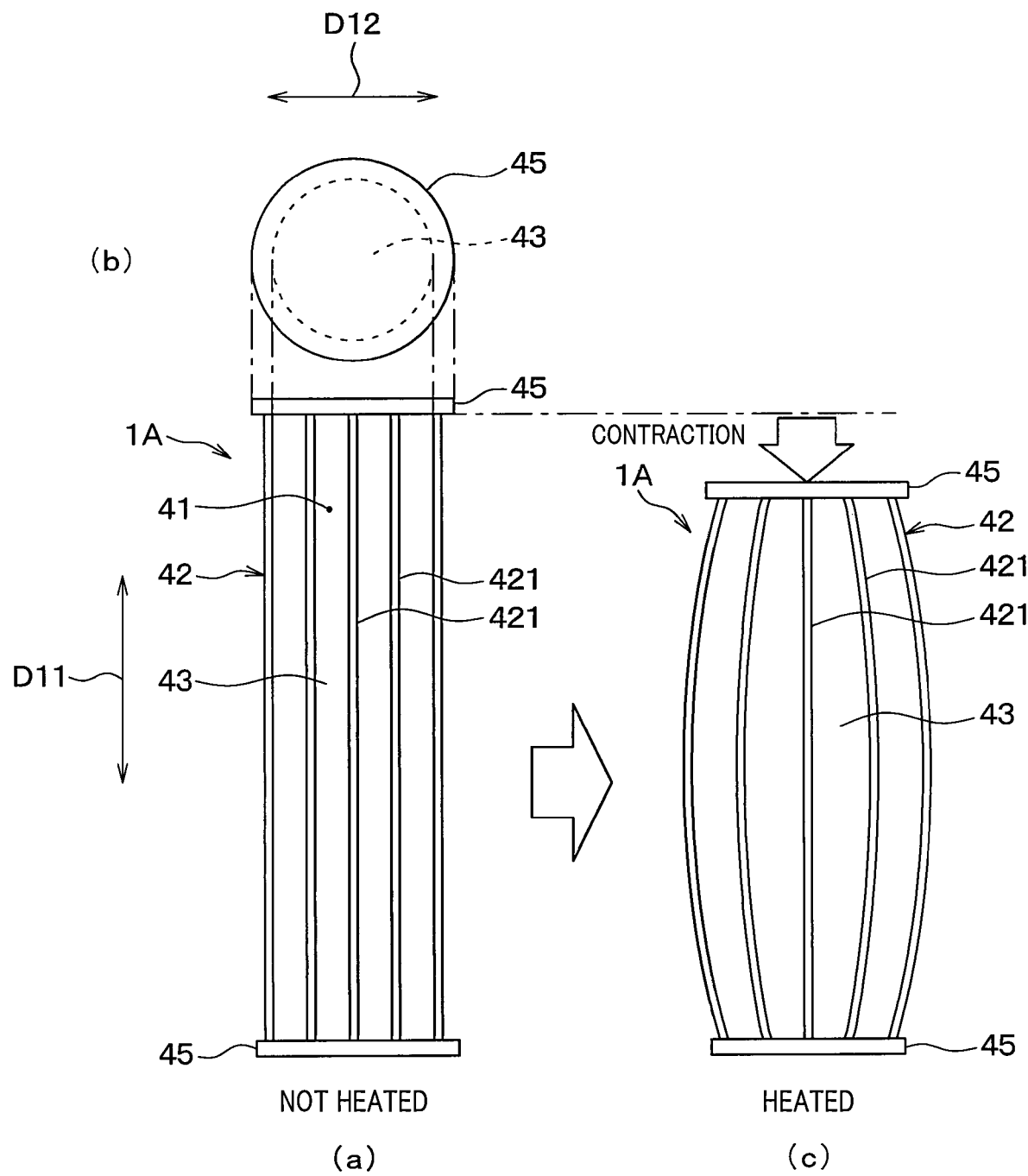
FIG. 15 is a schematic view of an actuator, according to the second embodiment, having no joint.

The fiber material constituting the actuator 1A according to the present embodiment does not necessarily include the joint 44 as illustrated in FIGS. 15(a), 15(b), and 15(c). Even when including no joint 44, the actuator 1A is enabled to attain high output for the reasons described above. FIG. 15(a) is a side view of the actuator 1A according to the present embodiment that has not been heated and has no joint. FIG. 15(b) is a top view of the actuator 1A in FIG. 15(a). FIG. 15(c) is a side view of the actuator 1A according to the present embodiment that has been heated and has no joint.

Figure 16:
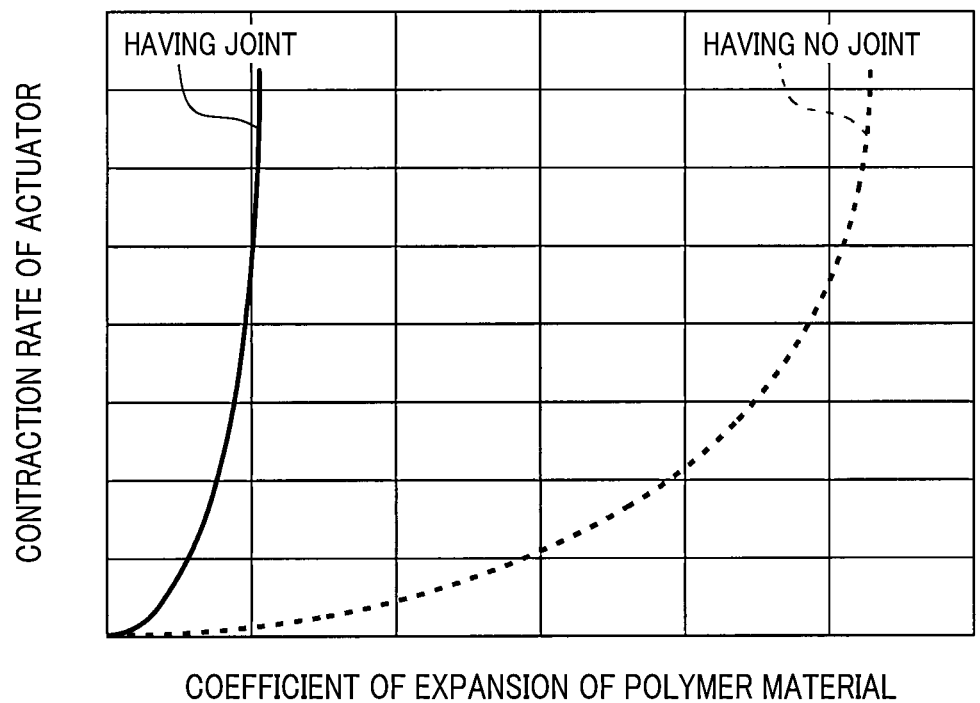
FIG. 16 is a graph illustrating, with regard to each of the actuators, according to the second embodiment, having a joint and having no joint, a relationship between the coefficient of expansion of a polymer material and the contraction rate of the actuator.

The actuator 1A according to the present embodiment further exhibits the following effects. The fiber material constituting the actuator 1A includes the joint 44. As illustrated in FIG. 16, the actuator 1A having the joint 44 can increase the contraction rate in the fiber axis direction D11 compared to the actuator 1A having no joint 44, when the polymer material 43 has the same coefficient of expansion in both the cases. That is, when the amount of change in the volume of the polymer material 43 is the same, the joint 44 enables the actuator 1A to increase the amount of contraction in the fiber axis direction D11. Changing the intervals between circular parts of the joint 44 that are adjacent to each other in the fiber axis direction D11 enables adjustment in the amount of contraction of the actuator 1A.

In the actuator 1A according to the present embodiment, the fibers constituting the braided sleeve 42 are electrically conductive as in a carbon fiber, a metal fiber, and the like, and preferably generate heat through electrification. This configuration enables heat energy to be input into the polymer material 43 by electrifying the braided sleeve 42.

Similarly, in the actuator 1A according to the present embodiment, the material constituting the joint 44 is electrically conductive as in a carbon fiber, a metal fiber, and the like, and preferably generates heat through electrification. This configuration enables heat energy to be input into the polymer material 43 by supplying a current to the joint 44.

Next, an example of the actuator 1A having the above-described structure is described. The inventors of the present invention produced an actuator 1A having the structure illustrated in FIG. 20 by procedures illustrated in FIGS. 17, 18, and 19.

Figure 17:
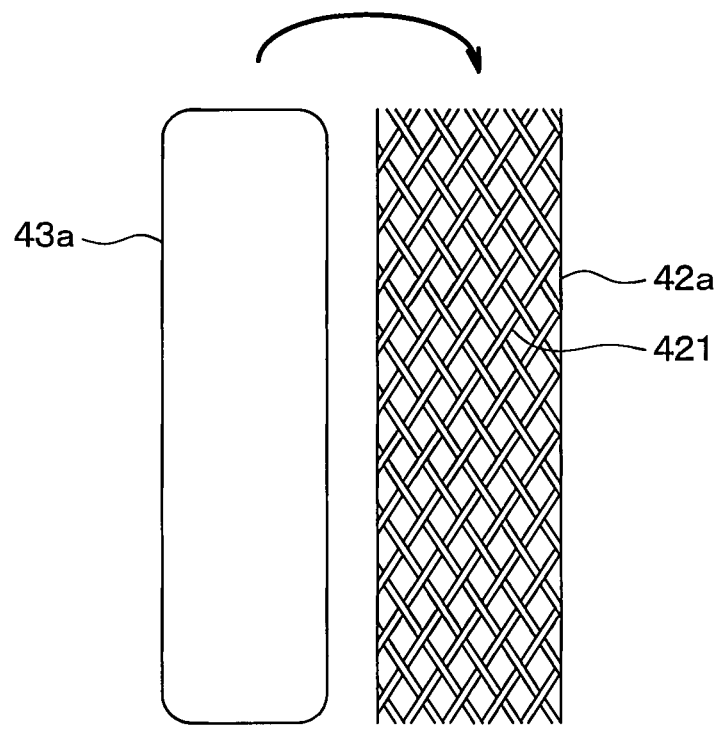
FIG. 17 is a diagram for describing a method for manufacturing an actuator in an example.

As illustrated in FIG. 17, a carbon fiber braided sleeve 42a as the braided sleeve 42 and a silicone rubber string 43a as the polymer material 43 were prepared, and the silicone rubber string 43a was put into the carbon fiber braided sleeve 42a. In the carbon fiber braided sleeve 42a, a plurality of fibers 421 constituting the braided sleeve 42 were carbon fibers. The carbon fiber braided sleeve 42a was a knitted net formed by combination of the plurality of fibers 421. FIG. 17 illustrates formation of large voids between the plurality of fibers 421, but the voids were not actually formed as large as shown in the diagram. The prepared carbon fiber braided sleeve 42a had a minimum inner diameter of 5 mm and a maximum inner diameter of 8 mm. The prepared silicone rubber string 43a was made from silicone rubber and was a round string having a diameter of 5 mm and a hardness of 50.

Figure 18:
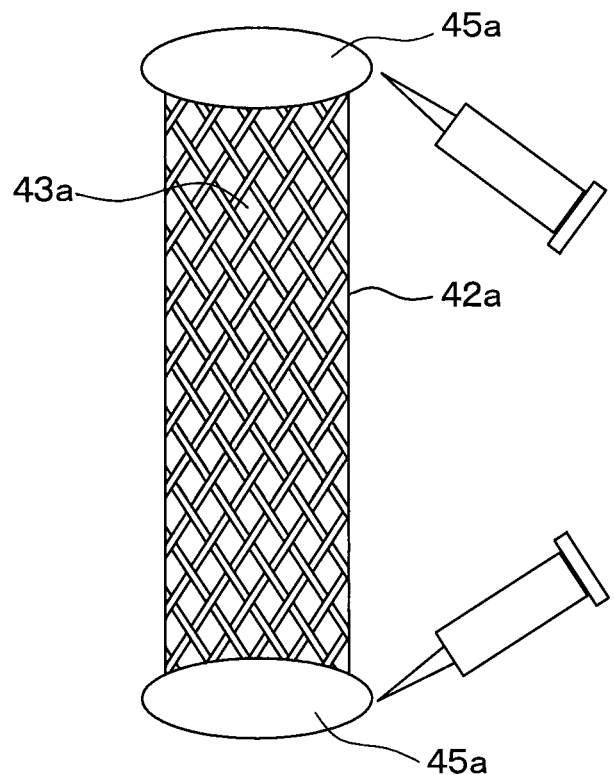
FIG. 18 is a diagram for describing the method succeeding FIG. 17.

Subsequently, as illustrated in FIG. 18, the ends in the axis direction of the carbon fiber braided sleeve 42a were fixed to the ends in the axis direction of the silicone rubber string 43a with an epoxy-based adhesive 45a as the fixing member 45, in order to suppress the expansion in the axis direction of the silicone rubber string 43a.

Figure 19:
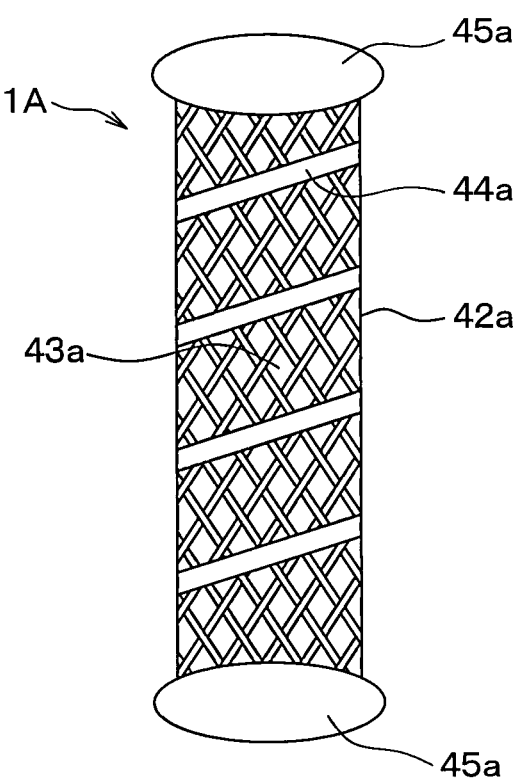
FIG. 19 is a diagram for describing the method succeeding FIG. 18.

Subsequently, as illustrated in FIG. 19, a wire 44a was prepared and spirally wound around the carbon fiber braided sleeve 42a. Further, the wire 44a was fixed to the carbon fiber braided sleeve 42a with an epoxy-based adhesive. A joint 44 was thereby formed. As the wire 44a, a nichrome wire having a diameter of 0.6 mm was used.

Figure 20:
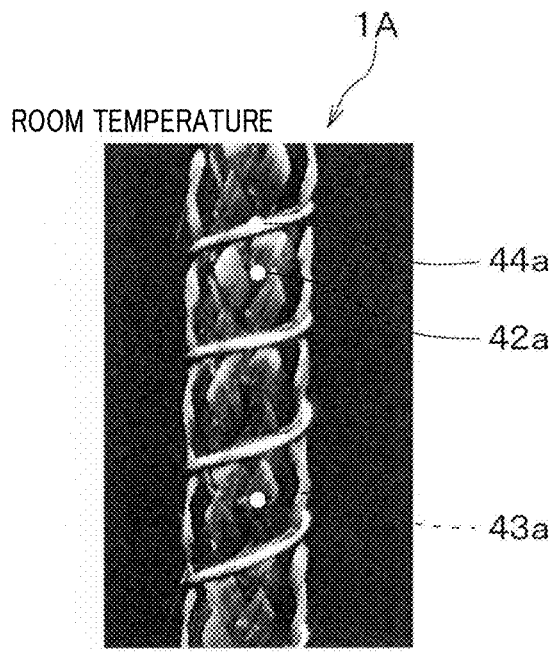
FIG. 20 is a photograph of an actuator that has not been heated in the example.

Thus, the actuator 1A having the structure illustrated in FIG. 20 was produced. In the produced actuator 1A, the silicone rubber string 43a was disposed in the carbon fiber braided sleeve 42a. In addition, the wire 44a formed the spiral joint.

Figure 21:
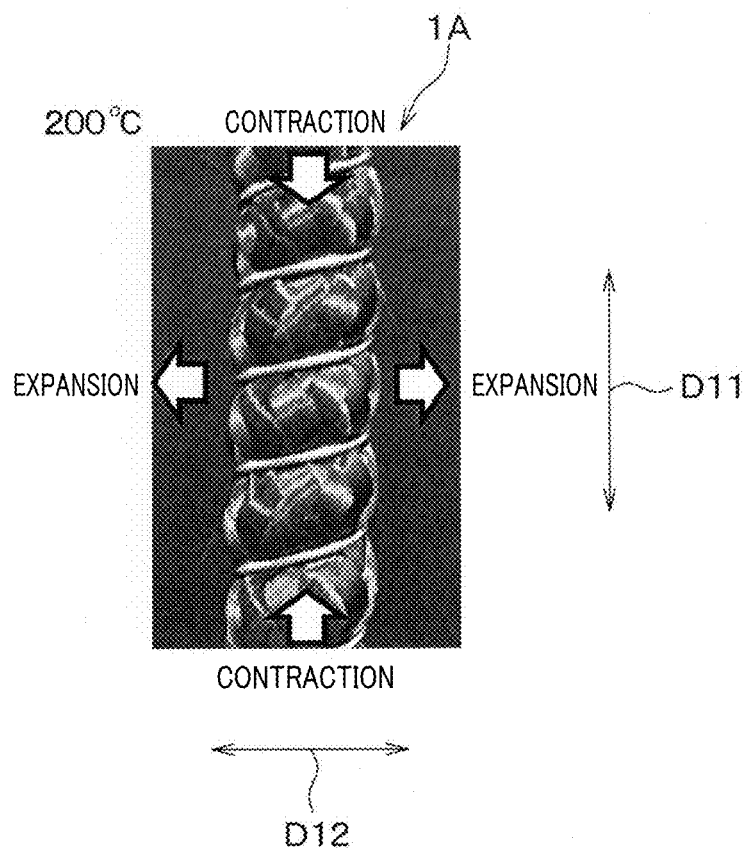
FIG. 21 is a photograph of the actuator that has been heated in the example.

When heated at 200° C., the produced actuator 1A was, as illustrated in FIG. 21, expanded in the width direction D12 and contracted in the fiber axis direction D11. The inventors of the present invention confirmed that the produced actuator 1A generates, in the contraction, a stress five or more times the stress of the actuator that includes PA6 and is disclosed in C. S. Haines et al., Artificial muscles from fishing line and sewing thread. Science 343, 868-872 (2014).

OTHER EMBODIMENTS

The present invention is not limited to the above-described embodiments and can be modified appropriately within the scope of claims and includes various modified examples and modifications within the range of equivalency of the claims. The embodiments are not irrelevant to each other, and can be appropriately combined except when the combination is obviously impossible. It is to be noted that in the embodiments, the elements constituting the embodiments are not necessarily essential except, for example, when particularly specified to be essential or when obviously considered to be essential in principle. In addition, the constituent elements of the embodiments that are, in the embodiments, referred to in terms of the number, the numerical value, the amount, and the numerical value of the range are not to be limited to the specific number except, for example, when particularly specified to be essential or when obviously limited to the specific number in principle. Further, the constituent elements and the like that are, in the embodiments, referred to in terms of the material, the shape, the positional relationship, and the like are not to be limited to the specific material, the specific shape, the specific positional relationship, and the like except, for example, when particularly specified or when limited to the specific material, the specific shape, the specific positional relationship, and the like in principle.

What is claimed is:

1. An actuator comprising:
a volume change part housed in the housing part, the volume change part being configured to increase a volume thereof by external input of external energy except mechanical energy;
a frame structure part that forms a frame structure surrounding a housing part, the frame structure part being configured to deform to contract the housing part in a first direction and widen the housing part in a second direction different from the first direction along with the increasing of the volume of the volume change part; and
a fiber material having a fiber axis direction, the fiber material being composed of at least a polymer material including a plurality of crystalline portions in which polymer chains are regularly arranged, a plurality of tie molecule domains in which polymer chains extend to connect the plurality of crystalline portions to each other, and a plurality of amorphous portions in which polymer chains are irregularly arranged, an extension direction of the polymer chains in the amorphous portion being along the fiber axis direction,
wherein the frame structure part has a higher Young's modulus than a Young's modulus of the volume change part,
the actuator is configured to output tensile force in the fiber axis direction by the external input of the external energy, and
the first direction is along the fiber axis direction.

2. The actuator according to claim 1, wherein
the housing part has an anisotropic shape, with a maximum width in the first direction of the housing part longer than a maximum width in the second direction of the housing part.

3. The actuator according to claim 2, wherein
the plurality of tie molecule domains include a plurality of first tie molecule domains extending in the first direction and a plurality of second tie molecule domains extending in the first direction,
the plurality of first tie molecule domains and the plurality of second tie molecule domains are disposed alternately one by one in a second direction perpendicular to the first direction,
one second tie molecule domain among the plurality of second tie molecule domains and one first tie molecule domain among the plurality of first tie molecule domains form a first space therebetween, the one first tie molecule domain being positioned adjacent to the one second tie molecule domain on one side in the second direction,
the one second tie molecule domain and one first tie molecule domain among the plurality of first tie molecule domains form a second space therebetween, the one first tie molecule domain being position adjacent to the one second tie molecule domain on another side in the second direction,
the plurality of crystalline portions include a plurality of first crystalline portions disposed in the first space and a plurality of second crystalline portions disposed in the second space,
the plurality of amorphous portions include a plurality of first amorphous portions disposed in the first space and a plurality of second amorphous portions disposed in the second space,
the plurality of first crystalline portions and the plurality of first amorphous portions are, in the first space, disposed alternately one by one in the first direction,
the plurality of second crystalline portions and the plurality of second amorphous portions are, in the second space, disposed alternately one by one in the first direction,
one first crystalline portion among the plurality of first crystalline portions in the first space faces, in the second direction, one second amorphous portion among the plurality of second amorphous portions in the second space, and one second crystalline portion among the plurality of second crystalline portions in the second space faces, in the second direction, one first amorphous portion among the plurality of first amorphous portions in the first space, each of the plurality of amorphous portions has a longer length in the first direction than a length in the first direction of each of the plurality of crystalline portions, the volume change part is one amorphous portion among the plurality of amorphous portions, the frame structure part is a part of the plurality of crystalline portions and the plurality of tie molecule domains that surrounds the one amorphous portion, and the polymer material has a density of higher than 0 g/cm$^3$ and lower than 1.03 g/cm$^3$.

4. The actuator according to claim 3, wherein the polymer material contains a resin having an amide bond.

5. The actuator according to claim 4, wherein the resin is polyamide 12.

6. The actuator according to claim 1, wherein the polymer material contains polyamide 12.

7. The actuator according to claim 1, wherein the frame structure part is a braided sleeve having a tubular structure of a combination of one or more fibers and surrounds the housing part, and is stretched more easily in a width direction perpendicular to the fiber axis direction than in the fiber axis direction, the volume change part is a solid polymer material that is isotropically expanded by input of heat energy as the external energy when having no restriction to an outer shape thereof, and the solid polymer material increases a volume thereof by the input of the heat energy into the solid polymer material, and the braided sleeve is deformed to contract the housing part in the fiber axis direction and widen the housing part in the width direction along with the increase of the volume of the polymer material.

8. The actuator according to claim 7, wherein the one or more fibers constituting the braided sleeve generates heat by electrification.

9. The actuator according to claim 8, wherein the fiber material includes a joint that suppresses the expansion in the width direction of the braided sleeve, and the joint has a thinner shape than an outer shape of the braided sleeve and is fixed circularly or spirally around the braided sleeve at prescribed intervals.

10. The actuator according to claim 9, wherein a material constituting the joint generates heat by electrification.

11. An actuator comprising:

a fiber material having a fiber axis direction;

a volume change part housed in the housing part, the volume change being a solid polymer material configured to be isotropically expanded by external input of heat energy when having no restriction to an outer shape thereof; and a frame structure part that forms a frame structure surrounding a housing part, the frame structure having a tubular structure of a combination of one or more fibers and surrounding the housing part, and being stretched more easily in a width direction perpendicular to the fiber axis direction than in the fiber axis direction, the frame structure part being configured to deform to contract the housing part in a first direction along the fiber axis direction, and widen the housing part in second direction different from the first direction along with the increasing of the volume of the volume change part, wherein the frame structure part has a higher Young's modulus than a Young's modulus of the volume change part, and the actuator outputs tensile force in the fiber axis direction of the fiber material by the external input of the heat energy.

12. An actuator comprising:

a volume change part housed in the housing part, the volume change part being configured to increase a volume thereof by external input of external energy except mechanical energy;

a frame structure part that forms a frame structure surrounding a housing part, the frame structure part being configured to deform to contract the housing part in a first direction and widen the housing part in second direction different from the first direction along with the increasing of the volume of the volume change part; and a fiber material, wherein the frame structure part has a higher Young's modulus than a Young's modulus of the volume change part, the actuator outputs tensile force in a fiber axis direction of the fiber material by the external input of the external energy, the first direction is a direction along the fiber axis direction, the housing part has an anisotropic shape, with a maximum width in the first direction of the housing part longer than a maximum width in the second direction of the housing part, the fiber material is composed of at least a polymer material including a plurality of crystalline portions in which polymer chains are regularly arranged, a plurality of tie molecule domains in which polymer chains extend to connect the plurality of crystalline portions to each other, and a plurality of amorphous portions in which polymer chains are irregularly arranged, the plurality of tie molecule domains include a plurality of first tie molecule domains extending in a first direction as the first direction and a plurality of second tie molecule domains extending in the first direction, the plurality of first tie molecule domains and the plurality of second tie molecule domains are disposed alternately one by one in a second direction perpendicular to the first direction, one second tie molecule domain among the plurality of second tie molecule domains and one first tie molecule domain among the plurality of first tie molecule domains form a first space therebetween, the one first tie molecule domain being positioned adjacent to the one second tie molecule domain on one side in the second direction, the one second tie molecule domain and one first tie molecule domain among the plurality of first tie molecule domains form a second space therebetween, the one first tie molecule domain being position adjacent to the one second tie molecule domain on another side in the second direction, the plurality of crystalline portions include a plurality of first crystalline portions disposed in the first space and a plurality of second crystalline portions disposed in the second space, the plurality of amorphous portions include a plurality of first amorphous portions disposed in the first space and a plurality of second amorphous portions disposed in the second space, the plurality of first crystalline portions and the plurality of first amorphous portions are, in the first space, disposed alternately one by one in the first direction, the plurality of second crystalline portions and the plurality of second amorphous portions are, in the second space, disposed alternately one by one in the first direction, one first crystalline portion among the plurality of first crystalline portions in the first space faces, in the second direction, one second amorphous portion among the plurality of second amorphous portions in the second space, and one second crystalline portion among the plurality of second crystalline portions in the second space faces, in the second direction, one first amorphous portion among the plurality of first amorphous portions in the first space, each of the plurality of amorphous portions has a longer length in the first direction than a length in the first direction of each of the plurality of crystalline portions, the volume change part is one amorphous portion among the plurality of amorphous portions, the frame structure part is a part of the plurality of crystalline portions and the plurality of tie molecule domains that surrounds the one amorphous portion, and the polymer material has a density of higher than 0 $g/cm^3$ and lower than 1.03 $g/cm^3$.

* * * * *